(12) United States Patent
Hodes

(10) Patent No.: US 12,103,854 B2
(45) Date of Patent: Oct. 1, 2024

(54) SYSTEM AND METHOD FOR THE FABRICATION OF NANODIAMOND PARTICLES

(71) Applicant: Daniel Hodes, Owings Mills, MD (US)

(72) Inventor: Daniel Hodes, Owings Mills, MD (US)

( * ) Notice: Subject to any disclaimer, the term of this patent is extended or adjusted under 35 U.S.C. 154(b) by 0 days.

(21) Appl. No.: 18/122,329

(22) Filed: Feb. 5, 2024

(65) Prior Publication Data
US 2024/0190708 A1    Jun. 13, 2024

Related U.S. Application Data

(62) Division of application No. 17/300,659, filed on Sep. 15, 2021, now Pat. No. 11,608,272.

(51) Int. Cl.
    *C01B 32/26*    (2017.01)
    *B82Y 40/00*    (2011.01)

(52) U.S. Cl.
    CPC ............. *C01B 32/26* (2017.08); *B82Y 40/00* (2013.01); *C01P 2004/30* (2013.01); *C01P 2004/64* (2013.01)

(58) Field of Classification Search
    CPC .................................................. C01B 32/26
    See application file for complete search history.

(56) References Cited

U.S. PATENT DOCUMENTS

| | | | |
|---|---|---|---|
| 4,609,428 A | 9/1986 | Fujimura | |
| 4,767,608 A | 8/1988 | Matsumoto | |
| 4,859,493 A | 8/1989 | Lemelson | |
| 5,314,652 A | 5/1994 | Simpson | |
| 5,818,173 A | 10/1998 | Perrin | |
| 10,766,775 B1* | 9/2020 | Hodes | C01B 32/184 |
| 2001/0001385 A1 | 5/2001 | Nakamura | |
| 2003/0117080 A1 | 6/2003 | Dandi | |
| 2004/0255867 A1 | 12/2004 | Ulrich | |
| 2012/0187842 A1 | 7/2012 | DiVergilio | |
| 2014/0377472 A1 | 12/2014 | Aizawa | |

* cited by examiner

*Primary Examiner* — James A Fiorito
(74) *Attorney, Agent, or Firm* — William E. Beaumont of Juneau & Mitchell PLLC

(57) ABSTRACT

A method for fabricating nanodiamond particles in a nanodiamond fabrication reactor, which method entails:
  a) forming a composite of a plurality of diamond monolayers interspersed with a plurality of non-monolayer dihydrobenzvalene (DHB), one over the other, by reacting kinetically energized carbyne radicals with a supported layer of DHB, thus sealing off any subtended, unreacted DHB from further reaction with the kinetically energized carbyne radicals.
  b) subjecting the diamond monolayers to an anvil having a nanomachined strike face, with sufficient force to fracture the diamond monolayers, to thereby produce nanodiamond having a shape in the X-Y plane matching that of the nanomachined strike face and a Z-axis dimension (thickness) which is that of a diamond monolayer.

13 Claims, 13 Drawing Sheets

Representations of the Cubic Diamond Unit Cells

Step 1 Nanodiamond Particle Formation Reactor

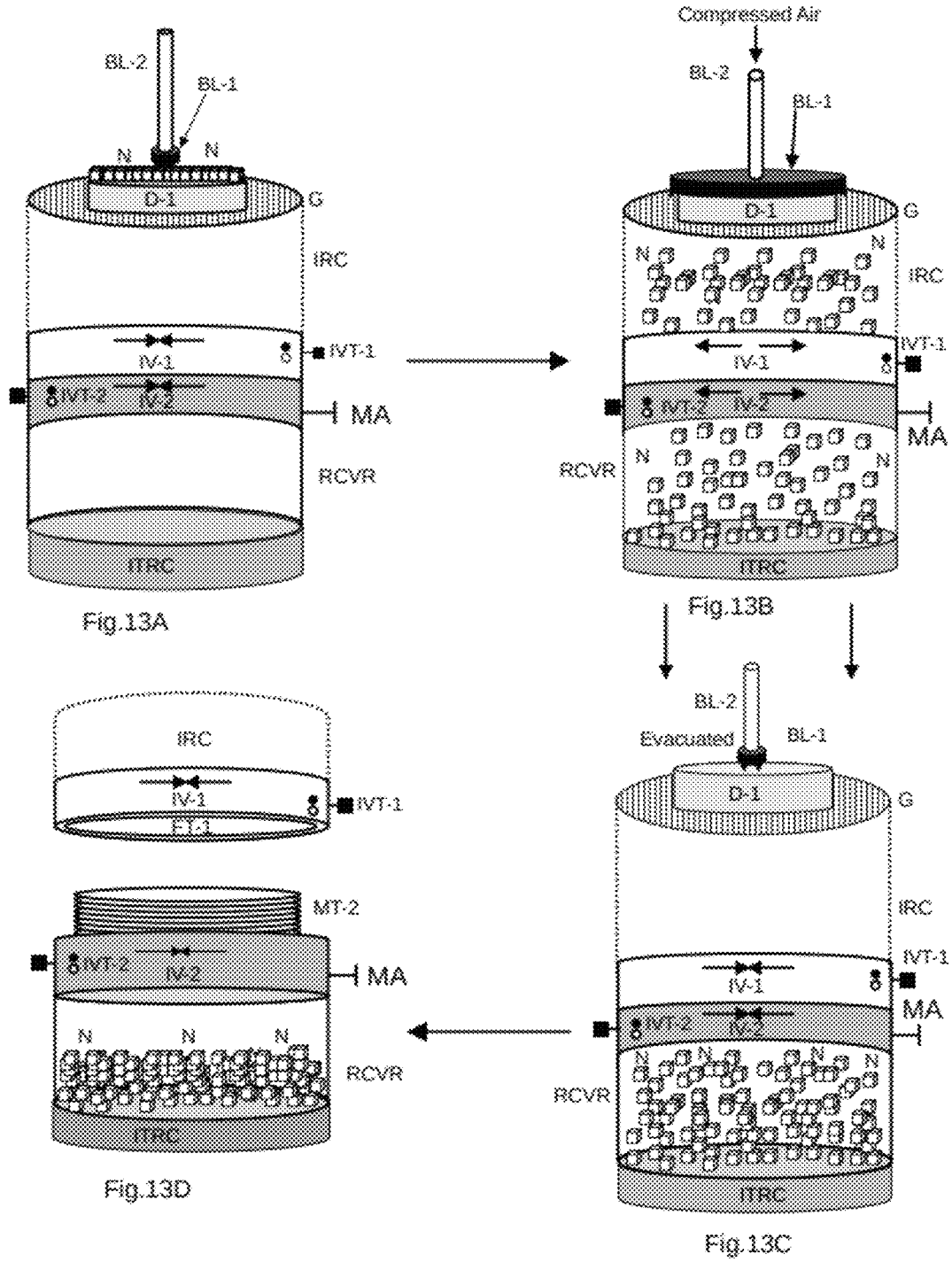

SYSTEM AND METHOD FOR THE FABRICATION OF NANODIAMOND PARTICLES

BACKGROUND OF THE INVENTION

Nanodiamond refers to diamond particles having submicrometer dimensions. These particles may be derived from natural processes such as meteor strikes and synthetic processes in which explosive force acts upon elemental carbon. Structural studies of nanodiamond indicate a core-shell structure wherein the core is diamond or diamond-like, and the surface (shell or cage) is graphitic which often evidence functional group attachment (phenol, pyrone, epoxy, carboxylic and sulfonic acids). Nitrogen defects have been observed within synthetically produced nanodiamond. Both natural and synthetic nanodiamond are typically spherical or ellipsoids, but these shapes are irregular.

Nanodiamond fabrication is done by detonation of a confined mass of carbon, and these process conditions are similar to those of high pressure high temperature (HTHP) diamond forming conditions (>2,500° C., about $2 \times 10^6$ psi), and the diamond product so produced contains large amounts of impurities requiring impurity removing post treatments such as acids and/or oxidants. HPHT itself as well as chemical vapor deposition (CVD) are not suitable for producing nanodiamonds. Although detonation is the industry standard for nanodiamond production, precise control over both shape and dimension of nanodiamond particles by any of the current industrial fabrication methods is not possible. Further, detonation production of nanodiamond requires that extensive cleaning methods be used to rid the product mixtures of impurities. Such cleaning methods include ozone treatment or treatment with solution phase nitric acid.

Recently, Banjeree et al. in Science, Apr. 20, 2018, Vol. 360, Issue 6386, pp. 300-302, described "Ultralarge elastic deformation of nanoscale diamond" (available freely on line: doi:10.1126/science.aar4165) wherein nanodiamond needles are obtained by plasma etch of diamond films.

Nevertheless, a need exists for a method and apparatus for fabrication of nanodiamond in a simple manner, and without the need to remove graphitic impurities which commonly result from detonation production of nanodiamond. Nanodiamond has many industrial applications. For example, nanodiamond has low to no cytotoxicity and can cross the blood brain barrier making nanodiamond useful as a drug delivery agent. Further, pharmaceutically useful proteins can be bound to diamond and find use in bone repair. Nanodiamond can be made fluorescent, and nitrogen vacancy diamonds respond to microwaves making both types useful as in-vitro sensors. Nitrogen vacancy diamonds can also be used as sensors for measuring weak magnetic fields and can be used as photonic switches for optical computing being stimulated by green and infra-red light. As such, nanodiamond can find use in quantum computing. All of these uses make the provision of a method and apparatus for the fabrication of nanodiamond in a simple and reliable manner a necessity.

SUMMARY OF THE INVENTION

Accordingly, the present invention provides a method for fabricating nanodiamond in a simple and reliable manner without requiring extensive cleaning of product.

The present invention also provides an apparatus in which the method for fabricating nanodiamond is effected. This apparatus is, in fact, required for practicing the claimed method.

The present invention is directed to a novel method and apparatus for the fabrication of nanodiamond particles having controlled shape and dimension in the X-Y plane and a Z-axis dimension (thickness) which is that of a monolayer of diamond. The most practical method for obtaining this extremely low entropy form of diamond is the formation one or more diamond monolayers from which nanoparticulate diamond is obtained by fracturing the diamond monolayer(s) using a Guillotine having an anvil, and the strike face of this anvil is nanomachined. Upon impact with the diamond monolayer(s) by the anvil, the nanodiamond particles so obtained have shape in the X-Y plane which is that of the nanomachined anvil strike face profile. The Z-axis dimension (thickness) of the nanodiamond particles so produced is that of a diamond monolayer.

BRIEF DESCRIPTION OF THE DRAWINGS

FIG. 13A depicts bladder BL-1 at the tip of compressed air delivery conduit BL-2 and is positioned just above nanodiamond particles N resident upon fabrication substrate D-1 supported by open grate G. FIG. 13B depicts bladder BL-1 being expanded by compressed air delivered through compressed air delivery conduit BL-2 driving nanodiamond particles N from fabrication substrate D-1 through grate G into receiver conduit IRC having islolation valves IV-1 and IV-2 open. FIG. 13C shows isolation valves IV-1 and IV-2 shut with end product nanodiamond particles N contained within the receiver. FIG. 13D shows the isolation, recovery, and transfer means for end product nanodiamond particles. Isolation valves IV-1 and IV-2 are actuated by an external valve controller (not shown).

DETAILED DESCRIPTION OF THE PREFERRED EMBODIMENTS

Term Definitions

Figure 1A:
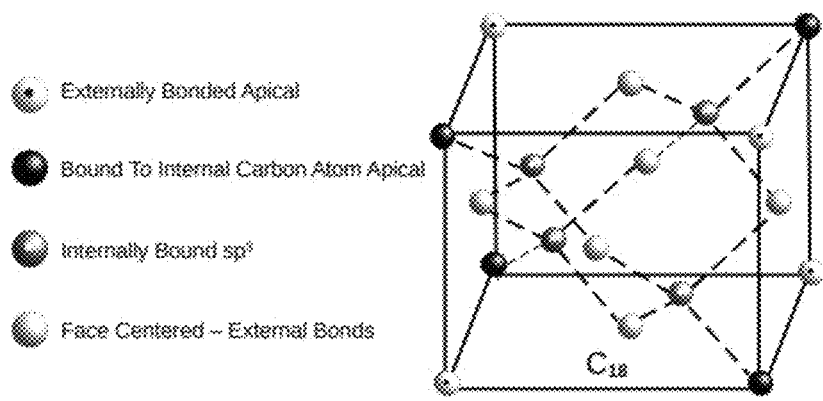
FIG. 1A shows the diamond unit cell deduced from the X-ray crystallography of naturally occurring diamond and synthetic diamond produced by HPHT and CVD processes.

The following selected terms used in the present specification are defined as follows:

Carbyne radicals: are radicals obtained by radiolytic scission or cleavage of acetylene in a radiolytic cavity, and which are paramagnetic as a consequence of having an unshared electron.

Kinetically energized carbyne radicals: are carbyne radicals which have been energized after transiting through a magnetic accelerator.

Mass flow conduit: is a conduit through which the generated carbyne radicals transit from the radiolytic cavity to the magnetic accelerator and to the deposition substrate.

Dihydrobenzvalene (DHB): is a commercially available product. It can also be photosynthesized by first irradiating benzene at 160-254 nm as described by Wilzbach in 1967, followed by reduction with diimine. Or the more direct approach of Katz from 1971 may be used by reacting lithium cyclopentadiene with methyllithium, in the presence of solvents dichloromethane and dimethyl ether followed by in situ reduction with diimine to produce dihydrobenzvalene. Both methods obtain dihydorbenzvalene from the crude reaction mixture by passivation of this mixture and removal of dimethyl ether and dichlormethane followed by isolation of pure dihydrobenzvalene by fractional distilation.

The present invention relies upon the chemical synthesis of a transient 5 carbon atom tetrahedral molecule, "carbon tetracarbide", from which a diamond mass forms by the self-assembly of many of these reactive intermediates. This chemical synthesis is disclosed in my previous U.S. Pat. Nos. 8,778,295, 9,061,917, and 10,766,775 which are incorporated herein by reference. Both the '295 and '917 patents teach the radiolytic decomposition of cubane to produce a carbon atom which reacts with catalytically generated transient tetrahedrane ('295 patent) or the tetrahedranoidal molecule benzvalene ('917 patent) to produce the $C_5$ tetrahedron. Like their physical diamond fabrication process counterparts (HPHT, CVD), the methods of the '295 and '917 patents are impractical for diamond monolayer formation because they lack the precision required for diamond monolayer formation. They can produce high purity diamond as a mass, but not as a monolayer.

The present invention is based upon the method of the '775 patent wherein a kinetically energized carbyne radical (:CH or ·CH, energy state dependent) impacts and reacts with a supported layer of dihydrobenzvalene (DHB) to form the $C_5$ tetrahedral molecule which self-assembles to produce diamond as a monolayer. This requires that DHB be deposited as a precise monolayer upon a newly formed diamond monolayer for reaction with kinetically energized carbyne radicals. A procedure for depositing such a stoichiometrically precise monolayer upon each newly formed diamond monolayer is disclosed in the '775 patent. This procedure must be conducted within a separate apparatus with return of the DHB monolayer deposited upon the newly formed diamond to the diamond fabrication reactor. To preserve the integrity of this DHB monolayer, it is maintained at a reduced temperature to prevent mass loss due to DHB vapor pressure which is similar to that of benzene (~1 torr, −30° C.; ~0.2 psi).

Nanodiamond particles formed by the present invention have a Z-axis dimension (thickness) which is that of a diamond monolayer making adjacent diamond monolayer interbonding intolerable. To this end, the method and apparatus of the '775 patent are impractical for producing any reasonable quantity of nanodiamond particles.

To understand the patentably distinct differences between the present invention and the '775 patent, it is necessary to understand the concept of the diamond unit cell which is accepted as the fundamental motif ("building block") of carbon atoms comprising the substance known as diamond. The construct of the diamond unit cell is found in college level inorganic chemistry and physics textbooks. It is important to recognize that the repeating construct of the diamond unit cell is not isolable, and is, thus, distinct from the reactive intermediate, carbon tetracarbide.

A diamond unit cell is shown in FIG. 1a which is the result of data reduction from X-ray crystallographic data for both naturally occurring and man-made diamond. Depicted in one of several possible rotations about the X and Y axes, this structure is a face centered cube comprising 18 carbon atoms as 8 apical sp carbon atoms, 6 face centered $sp^2$ carbon atoms, and 4 internal $sp^3$ carbon atoms.

Figure 1B:
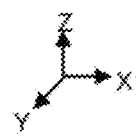
FIG. 1B shows a proposed diamond unit cell structure obtained from the formation of the self-assembly of the $C_5$ tetrahedron obtained by the reaction of cubane with tetrahedrane or with benzvalene or by the reaction of a kinetically energized carbyne radical with a supported layer of dihydrobenzvalene (DHB).
Figure 1B:
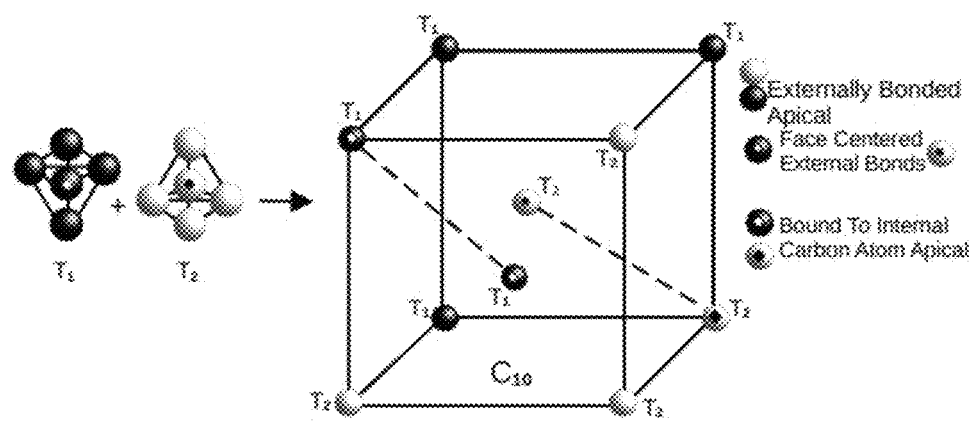

A proposed representation of the diamond cubic unit cell resulting from assembly of two $C_5$ tetrahedral molecules is shown in FIG. 1b in one of several possible rotations about X and Y axes as 8 apical sp carbon atoms and 2 face centered sp carbon atoms.

Figure 4:
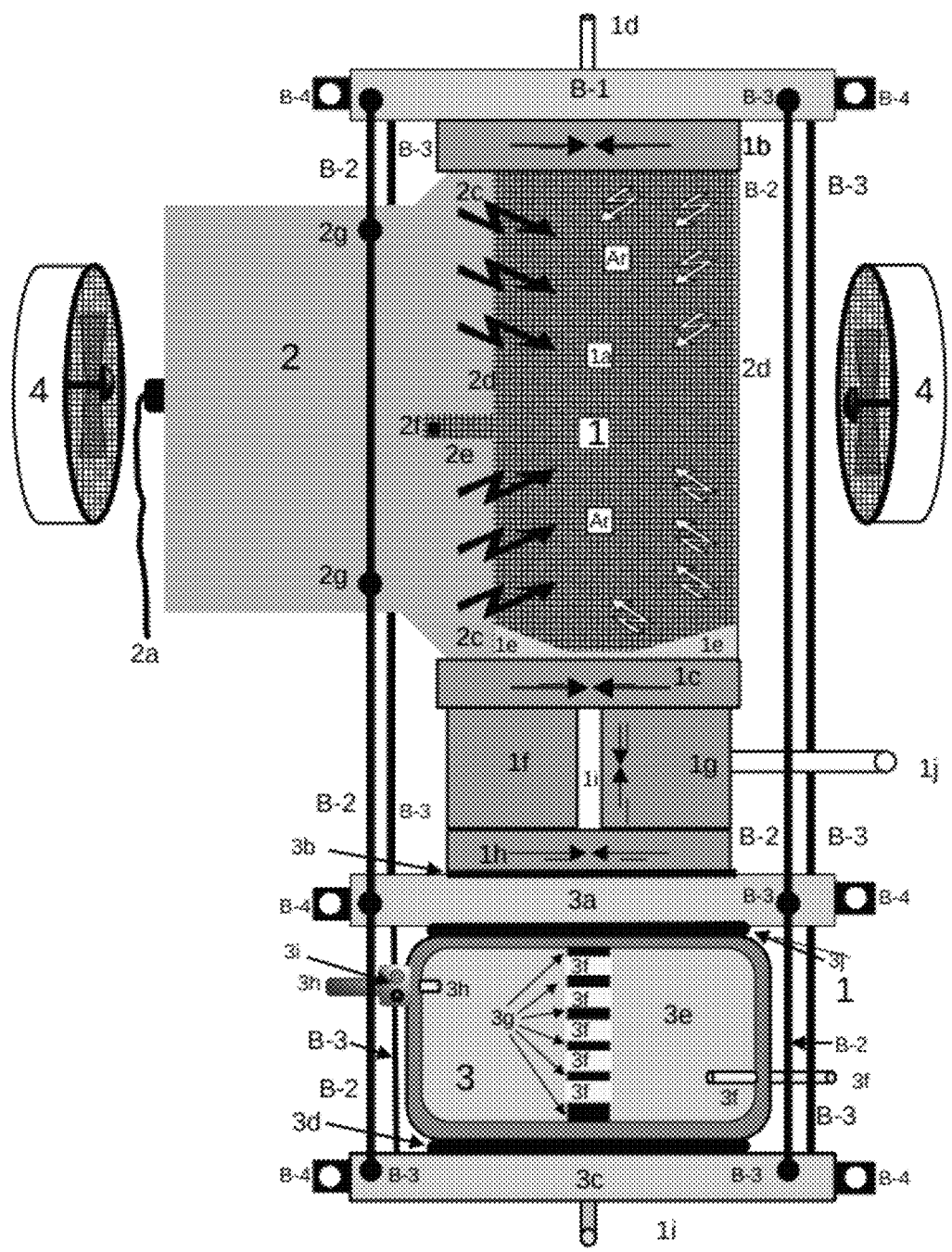
FIG. 4 shows the carbyne radical generator.

For the $C_{18}$ unit cell representation of FIG. 1a, 4 apical carbon atoms and 6 face centered carbon atoms are available for carbon-carbon bond formation between adjacent unit cells. For the $C_{10}$ unit cell representation of FIG. 1b, 6 apical carbon atoms and 2 face centered carbon atoms are available for carbon-carbon bond formation between adjacent unit cells. As depicted in both figures, it is the carbon atoms of the Z-axis face which may undergo carbon-carbon bond formation between adjacent diamond unit cells: 2 apical sp and 2 face centered $sp^2$ carbon atoms for a $C_{18}$ unit cell representation; 1 face centered sp and 3 apical sp carbon atoms for a $C_{10}$ unit cell representation.

If the Z-axis face carbon atoms unit cells comprising adjacent diamond monolayers are not passivated, interbonding between adjacent diamond monolayers can occur due to carbon-carbon bond formation between adjacent unit cell Z-axis face carbon atoms. It is this mechanism which is likely for the formation of a diamond mass from the many diamond monolayers formed by the method of the '775 patent.

The present invention intercepts interbonding between adjacent diamond monolayers by depositing an excess of DHB rather than a precise monolayer of DHB upon a newly formed diamond monolayer. By this method, the constraints due to the stoichiometric precision requirements for DHB monolayer deposition and integrity do not exist, and DHB layer deposition does not require a separate apparatus. A spray deposition component integral with the diamond fabrication reactor is adequate for DHB non-monolayer deposition service. Such spray deposition could not provide the stoichiometrically precise DHB monolayer required by '775 patent method reliably.

Method of the Invention

The present invention produces nanodiamond particles by a two-step process:
1) formation of a nanodiamond precursor comprising one or more diamond monolayers wetted with excess, unreacted dihydrobenzvalene (DHB);
2) impacting this precursor using an anvil having a nanomachined strike face driven with a force sufficient to fracture the one or more diamond monolayers into nanodiamond particles having shape in the X-Y plane matching that of the strike face profile and a Z-axis thickness of a diamond monolayer.

For the first embodiment reactor, the nanodiamond particle precursor is a composite "stack" of many diamond monolayers interspersed with excess, unreacted DHB between the diamond monolayers. For the second embodiment reactor, the nanodiamond particle precursor is a single diamond monolayer wetted with excess, unreacted DHB.

The anvil having a nanomachined strike face may be the same for both reactor embodiments. The anvil strike face profile is formed by nanomachining methods such as electron beam etch or laser ablation Nanomachining of metals and tough composite materials is a mature technology. The two most common methods used for obtaining nanomachined surfaces are laser ablation ("laser writing") and electron beam etch. Both are capable of producing surfaces having extreme topographies, and commercial providers of nanomachining services are numerous. Electron beam etch having a 2 nm spot size can provide topographies at ~10 nm scale. See, for example, University of Pennsylvania Materials Research Institute University Park PA. Nanomachining by laser ablation produces larger dimension surface topologies than those of electron beam etch. Surface topologies obtained by laser ablation depend upon the wavelength of light and spot heating times which are typically 233-248 nm and nanosecond or femtosecond pulse times. See, for example, Li et al, Nanotechnology and Precision Engineering, 3, (2020), pp. 105-125, "Theoretical fundamentals of short pulse laser-metal interaction: A Review." See, also, Potomac Photonics of Baltimore MD.

First Embodiment Reactor

Step 1: Composite Product Fabrication

Prior to conducting the first step, the nanodiamond fabrication reactor is evacuated, and the diamond fabrication substrate is cooled to ~−45° C. At this temperature, DHB will solidify and have a vapor pressure of ≤1 torr exerting a force≤0.2 psi upon diamond as a monolayer. The first step does not operate as a continuous flow process. Rather, it comprises a sequence of events which repeat until a targeted number of diamond monolayers is obtained:
1) generation of carbyne radicals in argon carrier gas;
2) impact of kinetically energized carbyne radicals upon a supported non-monolayer of DHB to form a diamond monolayer;
3) evacuation of the reactor to remove volatile side products.
4) spray deposition of a new non-monolayer of DHB upon the newly formed diamond monolayer. This sequence of events is repeated until a target number of diamond monolayers wetted with excess, unreacted DHB is obtained.

Step 2: Nanodiamond Particle Formation

The reactor is isolated and separated from its upstream apparatus components and separated from the magnetic accelerator. A tripod stand is attached at the reactor bottom. Cooling of the composite product is maintained while a flow of a gas which is denser that air (argon or $CO_2$) provides a "protective blanket" for removal of the fabrication top and replacement with a Guillotine top. This practice is common to synthetic chemists working with materials which are reactive with atmospheric oxygen and water vapor to provide the manipulative advantage of a "protective blanket" required for various component replacements and transfers. Once the top having a Guillotine integral with it is attached to the reactor, gas flow ceases. The refrigerant temperature sensor lead and refrigerant delivery lines are disconnected ceasing cooling of the fabrication substrate so that the layers of DHB within the composite product may melt and drain away from the composite "stack" placing little or no mechanical strain upon the diamond monolayers which will be wetted with residual DHB adhering by London forces between DHB and diamond monolayer bond site carbon atoms (unit cell Z-axis face apical and face centered). DHB drained from the "stack" may be recovered for recycling using a diaphragm pump. The connection to the between the DHB drain port and the DHB reservoir is disconnected once residual DHB has been collected.

The composite product so obtained is impacted by a Guillotine anvil having a nanomachined strike face to fracture the diamond monolayers into nanodiamond particles. Nanoscale diamond fracture toughness has been found to be greater than it is for a typical diamond mass such as a 1 carat gemstone which can shatter with the force of a hammer blow (~12.5 $J/m^2$). Nanoscale diamond fracture toughness is estimated to be ~85-87 $J/m^2$. See, for example, S. F. Ferdous and A. Adnan, J. Nanomech. Micromech., 2017, 7(3): 04017010 (and references therein). Accordingly, uniform evacuative flow and low DHB vapor pressure will not compromise diamond monolayer integrity for a composite comprising diamond monolayers interspersed with DHB non-monolayers at solidus temperature.

The impact force of the anvil must be greater than the above-cited fracture toughness of nanoscale diamond for a single diamond monolayer multiplied by the number diamond monolayers comprising the composite stack product. The force required to propel the anvil may be provided by force of gravity, spring force, the electromagnetic force of a solenoid, or the force of pneumatic pressure which is preferred for method of the present invention.

How the diamond nanoparticles are recovered and/or subjected to post treatment depends upon their intended end use. For the second embodiment reactor, end product nanodiamond particles wetted with residual DHB adhering to these particles by London forces are isolated and removed from the reactor for transfer to a separate apparatus for whatever post treatment is required. Where surface properties are of no end use consequence, the nanodiamond particles may be recovered from the reactor and subjected to evacuation or atmospheric heating to remove any residual DHB. In this case, a flow of an inert gas is used for replacement of the Guillotine top by an isolation top.

Where the surface properties of nanodiamond particles produced in the first embodiment reactor are of end use consequence, the nanodiamond particles are exposed to a flow of carbon dioxide within the reactor which displaces adhered DHB and adheres to diamond monolayer bond sites more tenaciously than does DHB. Carbon dioxide adherence to nanodiamond has been observed experimentally, See, for example, Zou et. al., Journal of Experimental Nanoscience. Vol. 5, No. 4. August 2010. 219-238, "Analysis of the nanodiamond particle fabricated by detonation". (https://doi.org/10.1080/1745808090351021)

The reactor top is replaced by an isolation top using a flow of carbon dioxide. The sealed reactor is transferred to a dry box wherein the isolation top is removed from the reactor to recover the nanodiamond particles for anaerobic storage or packaging. Adhered carbon dioxide can be displaced easily by the end user using heat and/or vacuum or another species more adherent to the nanodiamond particles than carbon dioxide.

Second Embodiment Reactor

This reactor comprises means for diamond monolayer fabrication, means for nanodiamond particle formation, and means for isolation, transfer, and recovery of the end product nanodiamond particles. This reactor does not require separation from the magnetic accelerator for reconfiguration as does its first embodiment counterpart. Means for provision of DHB onto the diamond fabrication deposition substrate, means for diamond monolayer fabrication, means for nanodiamond particle formation, and means for transferring nanodiamond particles to a receiver are integral with the top end cap of this reactor. The receiver into which end product nanodiamond particles are transferred can be isolated from the reactor, isolated from the environment, and separated from the reactor, so isolated, for transfer of the nanodiamond particles within this receiver to a post processing apparatus without interruption of ongoing processes within this reactor.

The two steps of comprising the method of the present invention, diamond monolayer fabrication and nanodiamond particle formation, occur within this reactor at five separate stations using a pick and place robot to transport the diamond fabrication substrate to each station. The repeating sequence of events for end product nanodiamond particle formation comprises:
1) cooling of the diamond fabrication substrate at station 1;
2) spray depositing DHB onto the cooled diamond fabrication substrate at station 2;
3) reaction of the non-monolayer of DHB provided to the diamond fabrication substrate with kinetically energized carbyne radicals to form a diamond monolayer wetted with excess, unreacted DHB at station 3;
4) fracture of the diamond monolayer into nanodiamond particles by an anvil having a nanomachined strike face;
5) transfer of the nanodiamond particles from the diamond fabrication substrate to an isolation, transfer, and recovery receiver at station 5;
6) return of the diamond fabrication substrate to station 1 where it is cooled in preparation for subsequent nanodiamond particle fabrication events.

At stations 1, 2, and 3, the diamond fabrication substrate and DHB deposited onto this substrate are maintained at DHB solidus temperature.

Differing from its first embodiment counterpart, the method of nanodiamond particle formation within this reactor requires no melting and draining of excess, unreacted DHB because only a single diamond monolayer is used for each series of nanodiamond particle fabrication events rather than a composite stack of many diamond monolayers interspersed with excess, unreacted DHB between each layer. Excess DHB is recovered for recycling by reduced pressure evaporation and condensation in a cold trap and returned to the DHB reservoir by a diaphragm pump. Isolation, transfer, and recovery of end product nanodiamond particles to a post processing station does not require service interruption due to the design of the nanodiamond particles receiver.

As a non-limiting example, regardless of which nanodiamond fabrication reactor type is used, a monolayer of diamond 2 cm in diameter fractured by an anvil having a strike face profile comprising squares 100 nm on a side can produce $\sim 3 \times 10^{10}$ nanodiamond particles free of surface contaminants which can be passivated or activated by known surface agents such as Si, P, N, B, $CO_2$ which can displace adhered DHB. Unlike nanodiamond particles obtained by confined explosions, these nanodiamond particles will be identical having controlled shapes, dimensions and thickness, and graphite and carbo-nitrides typically found on the surfaces of nanodiamond particles produced by confined detonations cannot form under the conditions of diamond monolayer formation by the method of the present invention.

Paramagnetism and Electromagnetism

The method of the present invention exploits the phenomena of paramagnetism and electromagnetism. Paramagnetism is the magnetic susceptibility of chemical species having unpaired valence electrons—radicals. Paramagnetic species are charge neutral and are strongly attracted to magnetic fields. Diamagnetic species, also charge neutral, have no unpaired valence electrons and are weakly repelled by magnetic fields. The magnetic susceptibility of paramagnetic species is defined by the expression as $J/B_o$ where J is the magnitude of internal polarization, $B_o$ is the strength of the external magnetic field. The magnetic susceptibility of paramagnetic species is 1. Within a magnetic field, unpaired valence electrons of radicals such as carbyne radicals align with and couple to the magnetic field making them unavailable for chemical bond formation.

Experimental results of investigations into the magnetic susceptibility of hydrocarbon radicals are disclosed in "Magnetic Properties of Free Radicals," Volume 17, H. Fisher et al. Effective magnetic moments of some paramagnetic species are found in "Magnetic Properties of Free Radicals, Landholt-Bernstein, New Series, Group II, Volume 1, Berlin: Springer 1965 and Vols. 9aa-9d2, 1965. An important finding is that the g-factor (isotropic factor) of such radical species is very close to that of the free electron, which is extremely susceptible to magnetic fields, $g_e$=2.0023193134. The paramagnetic g-factor is an isotropic measurement or measurement of orderliness of a paramagnetic species within an applied magnetic field. The more highly ordered a magnetically susceptible (paramagnetic) species is within a magnetic field, the greater is the influence upon that species by the magnetic field. Application of a magnetic field to a mass of paramagnetic species results in first order Zeeman splitting or an energy difference, $\Delta E$, between aligned an unaligned magnetic dipoles which is proportional to the strength of the magnetic field. This difference is given by Boltzmann expression, $e^{-\Delta E/kT}$, where $\Delta E$ is much smaller than kT, the exponential is expanded as $1 - \Delta E/kT$ indicating that paramagnetic susceptibility is inversely proportional to temperatures. See Figgis, B. N.; Lewis, J. (1960) "The Magnetochemistry of Complex Compounds." For this reason, the apparatus of this invention operates at cryogenic temperatures to maximize the magnetic susceptibility of the carbyne radicals used by the method of this invention.

The '775 patent teaches that carbyne radicals must be kinetically energized by a force sufficient to drive the insertion of the carbyne radical into the molecular structure of DHB to form carbon-carbon bonds with carbon atoms of the bicyclobutanyl fragment of the DHB molecular structure to produce the $C_5$ tetrahedron which self assembles to form a diamond monolayer. As taught by the '775 patent, this force should be equivalent to a pressure ranging from 17-39 psi. The magnetic susceptibility of paramagnetic carbyne radicals makes it possible to kinetically energize carbyne radicals with this magnitude of force by magnetic acceleration. The present invention uses a magnetic accelerator which differs substantially from the magnetic accelerator of the '775 patent for this purpose.

Electromagnetic acceleration is a commonplace phenomenon. For example, consider the fuel injector deployed in the intake manifold of an internal combustion engine which acts as a valve to admit fuel-air mixture into the intake port of the cylinder upon which it is deployed. The fuel injector comprises an induction coil within which is the valve stem which is biased closed by spring force. The valve stem comprises a ferrous metal and is magnetically susceptible due to the phenomenon of ferromagnetism. Upon command by the engine controller (ECU), electric current is provided to the fuel injector induction coil, and the inductor stores this current as a magnetic field. The magnetic field acts on the magnetically susceptible valve stem to move it against the spring bias force to open the cylinder intake port to inlet the fuel-air mixture. Upon cessation of current flow to the fuel injector induction coil, the magnetic field collapses, and the spring force returns the valve stem to its closed position. Cycle times for fuel injectors can be as fast as 10 ms for non-racing internal combustion engines. In this case, the phenomenon of magnetic susceptibility is that of ferromagnetism and not paramagnetism; however, the principal is the same. A magnetically susceptible species will be moved (accelerated) by the force of a magnetic field applied to that magnetically susceptible species. Similar examples are the solenoid switch or valve. Electromagnetic accelerators are known such as those described in U.S. Pat. Nos. 4,710,722 and 8,232,747 which are incorporated herein by reference in their entirety. While features of both references may be incorporated into the design of the apparatus of this invention, the apparatus of this invention accelerates paramagnetic species which are charge neutral and not susceptible to the electrostatic fields used by these two cited exemplary accelerators.

The force exerted upon a magnetically susceptible mass by a hollow core electromagnet is known as its "pull strength" which is determined by an expression used by electrical engineers in the design and construction of electromagnets intended to impart motion to a mass as in the case of solenoid devices:

$$F=(n \times i)^2 \times 4 \pi \times 10^{-7} \times a/2g^2)$$

F is the force in Newtons; n is the number of coils or turns in the induction coil (the electromagnet); i is the current in amperes applied to the induction coil; a is the cross-sectional area for the magnetic field; g is the magnet gap, $4\pi \times 10^{-7}$ is the dimensionless magnetic constant. This expression reduces to: $F=(n \times i)^2 \times 19.7392 \times 10^{-7} \times r^2/g^2$ This expression is useful for single layer coils and multilayer coils which provide more coils over the same coil length than can a single layer coil and exponentially greater force than does a single layer coil.

The coil of the magnetic accelerator electromagnet is an inductor. Determination of properties of inductors for design, construction, and operation of the apparatus of this invention is necessary. Inductance is given by the formula: $L=\mu \times (N^2 \times A)/l$ where: L is the inductance in Henry's, N is the number of turns, A is the cross-sectional area of the coil (center of outer coil wire to center of opposite coil wire), l is the length of the coil, and u is the permeability of the coil, 1 for air or vacuum.

Figure 2A:
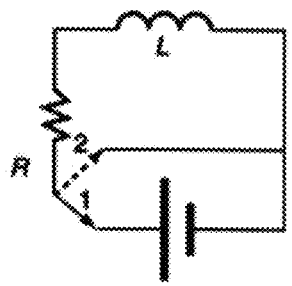
FIG. 2A shows a representation of a circuit comprising a resistor in series with an inductor, the R-L or L-R circuit.
Figure 2B:
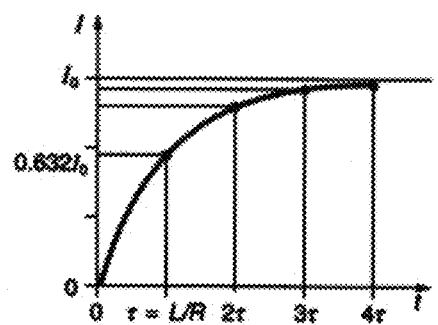
FIG. 2B shows a graphical representation of time constants for charging an inductor in the R-L circuit with current.
Figure 2C:
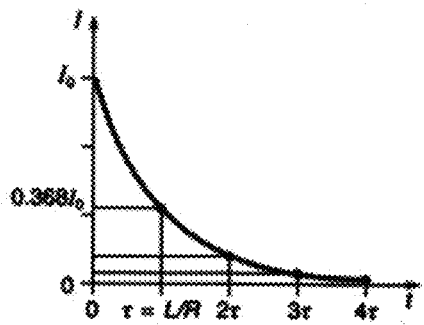
FIG. 2C shows a graphical representation of time constants for draining an inductor in the R-L circuit of current.

Time constants determine the duration of time needed to charge and/or drain inductor current. Typically, the inductor is in series with a resistor, and this circuit is the well-known R-L circuit. Where R is resistance in ohms ($\Omega$) and L is inductance in Henry's (H), the expression for the time constant is T=L/R where T is in seconds. A time constant is that amount of time required for the inductor to reach 0.632 of the current (I, in Amperes) applied to the inductor. To charge the inductor to ~100% current or to drain the inductor of its current (0%) requires 5 time constants, and this is referred to as "rise time" of the inductor. For example, an inductor having an inductance of 0.001 Henry's in series with a $10^6 \Omega$ resistor will have a charge/drain time $0.005/10^6$ seconds: 5 nanoseconds. This becomes important in design of emergency shut down in the event of cooling failure to prevent damage to an energized electromagnet as well as for initial energization. FIG. 2A is a graphical representation of an inductor R-L circuit, its charge and discharge times, and time constants for an inductor of an R-L circuit (FIGS. 2B and 2C).

Determination of magnetic field strengths may also be necessary. As disclosed above, the magnetic field of an inductor (an electromagnet) is greatest at the coil center decreasing with increasing radius. Axial magnetic field strength is greatest at the axial center of the coil and decreasing along the coil Z-axis. These values are obtained by expressions derived from the Biot-Savat laws.

Radial field strength is given by the expression: $B_r = \mu_o \times I/2R$ where: $B_r$ is the magnetic field strength at a point on the axis, R is the coil radius (from center of diameter of upper coil wire through coil to center of bottom coil wire diameter, in meters), $\mu_o = 4\pi \times 10^{-7}$ T×m/A where m is meters, A is area of coil, I is the current in amperes, T is in Tesla. Earth's magnetic field is ~0.5 Gauss or $5 \times 10^{-5}$ Tesla.

The expression for axial magnetic field strength is $B_z = (u_o/\pi) \times (R/Z^2 = R^2)^{3/2}$ where: $B_2$ is the axial magnetic field strength at a point along the z-axis (length) of the coil from the coil center, Z, is in meters and, $u_o$ and R are as defined above. These expressions apply for the magnetic fields of permanent magnets as well.

The population profile of a magnetically susceptible species within a magnetic field is directly proportional to the radial gradient and the axial gradient of magnetic field strength regardless of how a magnetic field is produced, permanent magnet or electromagnet. Using Biot-Savat Law expressions, some degree of control over the radial population gradient of magnetically susceptible species within a magnetic field is possible. For the present invention, this magnetically susceptible species is the carbyne radical.

The method of the present invention subjects magnetically susceptible paramagnetic carbyne radicals to magnetic force within a magnetic accelerator to provide the kinetic energy which drives the insertion of carbyne radicals into the molecular structure of supported DHB molecules to produce tetrahedral $C_5$ molecules which assemble to form diamond as a monolayer as is taught in the '775 patent. Upon impact with supported DHB molecules by kinetically energized carbyne radicals, this kinetic energy is transferred resulting in a pressure, an effective instantaneous pressure, sufficient to drive carbyne radical insertion to form tetrahedral $C_5$ molecules without compromising the bicyclobutanyl fragment of the DHB structure from which fragment the $C_5$ tetrahedron is derived.

The area over which this pressure is delivered by transfer of carbyne radical kinetic energy to the carbyne-DHB insertion is that which is defined by magnetic accelerator electromagnet coil inner diameter. A non-limiting example of a magnetic accelerator electromagnet having a 2 cm coil core inner comprising 100 layers of 100 turns (coils) of 0.1016 mm diameter (38 ga.) copper magnet wire operating at 3-5 amperes can produce magnetic force of 40-111 Newtons. Over the area defined by the coil core inner diameter, this range of force in Newtons is equivalent to ~127,235-353,429 $N/m^2$ or ~18.5-51.2 psi where 1 psi=~6895 $N/m^2$. Such a coil will weigh ~1 Kg and have an outer diameter of ~51 mm.

Cryogenic temperature operation is required for maximizing the magnetic susceptibility of the carbyne radicals and for the practical operation of the electromagnet. At ambient temperatures, 38 ga. copper magnet wire is rated to carry a maximum of 0.023 amperes for power transmission service, and the electromagnet will have a resistance of ~2,684Ω producing ~67.1 KW/second of heat due to copper magnet wire electrical resistance. The electrical resistance of copper is well known to decrease with temperature being ~2.5×10$^{-9}$ Ω/meter at 100° K. The magnetic accelerator electromagnet of the present invention will produce<1 Watt/second of heat due to electrical resistivity at 100° K. See, for example, J. Phys. Chem. Ref. Data, Vol. 8, No. 4, 1979; J. H. Bellinger, Bulletin of the Bureau of Standards, Vol. 7, No. 1 pp. 72-101; National Bureau of Standards Technical Note 365, *Survey of Electrical Resistivity Measurements on 16 Pure Metals In The Temperature Range 0 to 273° K.*, February, 1968; pp. 33-40.

Despite the low current level required for the magnetic force needed to drive the carbyne radical-DHB insertion reaction, a robust refrigerant is required which can be a liquid at ~100° K to maintain a safe operating temperature range for the magnetic accelerator electromagnet. The refrigerant for maintaining the magnetic accelerator electromagnet at this temperature must be electrically non-conductive. At ~100° K, argon can be used as the inert carrier gas for the carbyne radicals. It is preferred over helium due to cost, abundance, and ease of separation from side products such as acetylene (produced by carbyne radical recombination) and trace amounts of hydrogen which may form during carbyne radical generation. The preferred magnetic accelerator refrigerant of the present invention is $CF_4$, carbon tetrafluoride, referred to industrially as Freon-14 and R-14. $CF_4$ is a liquid between 89.7 and 145° K. At 100° K its molar heat capacity is ~107.7 J/mol/° K/second with a density of ~20.7 mol/liter. $CF_4$ is non-ozone depleting, allowed by the Paris Accords using prescribed handling methods, and readily available commercially. $CF_4$ is known for its high degree of chemical stability due to C—F bond strengths, ~130 kcal/mol. Low temperature closed system refrigeration systems capable of managing $CF_4$ as a pressurized liquid for cryogenic refrigerant service and for heat dissipation at higher temperatures are commercially available. Suppliers of $CF_4$ refrigeration systems also provide this refrigerant. See, for example, Critical Systems, Boise ID.

Carbyne Radical Generation

The present invention generates carbyne radicals by microwave radiolysis of acetylene in argon carrier gas, 1-6 KW @2.45 Ghz. See, for example, K. H. Becker, et al., *Chem. Phys. Lett.*, vol. 71, no. 2 (15 Apr. 1980) and R. Engeln, et al., *Chem. Phys. Lett.*, 310 (1999) 405-410. Magnetron amplifiers capable of this range of power and frequency are commercially available. Subjected to this power and frequency level, argon will be in an electronically excited state or as a plasma. The mixture of carbyne radicals diluted in argon exit the radiolysis cavity into a heat exchanger. Immediately following acetylene-argon radiolysis, a "burst" of additional argon gas is used to flush the radiolysis cavity. Microwave power delivery to the radiolysis cavity continues during this "burst" gas flush such that argon "burst gas will also be in an excited state or a plasma.

The preferred radiolysis cavity is a thick-walled quartz cylinder which is transparent to microwave energy. A non-limiting example of this cavity is a heavy wall quartz cylinder having interior dimensions of 10 cm×~5 cm (~785 $cm^3$). Quartz can maintain its integrity up to its strain temperature, ~1100° C. Without forced air cooling, radiolysis cavity operating temperatures can rise to ~300-400° C. Forced air cooling can reduce this temperature to ~250° C. A mixture of 0.001 mol of acetylene diluted in argon will within this exemplary radiolysis cavity result in radiolysis cavity internal pressures ~32-37 psi.

Heat Dissipation

Carbyne radical radiolysis temperatures can reach 300-350° C. (573-623° K) even with forced air cooling of the quartz radiolysis cavity. The magnetic accelerator operates at ~100° K. PTFE O-rings have safe seal specifications ranging from 60 to 535° K, but this is the range of safe seal operation NOT a safe seal temperature differential range. PTFE O-ring seals can be cycled between cryogenic and ambient temperatures numerous times without performance degradation. This cycling is performed incrementally before these seals are returned to their customary operating temperatures. Reliable seal performance at cryogenic temperatures is not an issue as long as the temperature differential is within a tolerable range. The large temperature differential between that of the argon-carbyne radical mixture exiting the radiolysis cavity and that of the magnetic accelerator, as much as ~573° K, cannot be tolerated by the best of these O-rings. Seal compromise can cause catastrophic loss of refrigerant leading to rapid temperature rises which can damage the magnetic accelerator electromagnet. Despite the relatively low currents carried by these electromagnet coil wires, they are operating at current levels beyond those for which they are rated at ambient temperatures. Heat increase due to electrical resistivity at elevated temperatures can melt or even pulverize these wires. The kinetic energy of these pulverized wires can cause serious and irreparable damage to the accelerator. This mandates means to reduce this temperature differential to a safe level. See Casidy et al., See *NBS Monograph* 109, *Investigation of the Exploding Wire Process as a Source for High Temperature Studies.*

A heat exchanger is deployed at the radiolysis cavity output. The mass flow conduit through which carbyne radicals diluted in argon transit from the radiolysis cavity through the entire apparatus is deployed within this heat exchanger which is tasked with dissipating this large amount of heat from the argon-carbyne radical mixture within the mass flow conduit. Methanol can provide reliable refrigerant service to ~180° K (f.p.=~175.6° K) having a molar heat capacity of ~71 J/mol/° K and density of ~0.9 $g/cm^3$ (NIST Chemistry WebBook, SRD 69). High flow rate, high-capacity laboratory recirculating chillers for methanol refrigerant management are commercially available.

The exemplary radiolysis events associated with a single diamond fabrication event (acetylene-argon radiolysis and radiolytic flush) impart a total quantity of heat to the mass within the radiolysis cavity which must be dissipated of ~8 J. A static volume of ~2 liters of refrigerant can dissipate this quantity of heat to reduce the temperature of this mass to the base operating temperature of the refrigerant.

An interface component is deployed between the radiolysis cavity heat exchanger output and the magnetic accelerator input. This component is a heat exchanger tasked with reducing the temperature of the mass of carbyne radicals diluted in argon carrier gas further. $CF_4$ refrigerant at ~100° K flows through this heat exchanger in contact with the surface of the mass flow conduit through which the carbyne radical-argon gas mixture transits. This component also has an input for secondary cooled argon carrier gas into its section of the mass flow conduit. This provides some measure of temperature reduction to the argon gas-carbyne radical mixture within the mass flow conduit within the mas flow itself.

Using these two separate sequential heat exchangers for temperature differential heat dissipation, it is possible to minimize this differential to a safe level for eliminating magnetic accelerator refrigerant seal compromise.

Radical Recombination Countermeasures

The method of the present invention provides countermeasures to the phenomenon of radical recombination. Carbyne radicals are generated by radiolytic fission of acetylene σ and π bonds to produce 2 carbyne radicals (:CH; ·CH, energy state dependent), but these radicals can recombine to re-form acetylene which freezes at ~191° K. Radical chain extension (a subject of organic and polymer chemistry textbooks) can also occur within the apparatus of the present invention to produce higher molecular weight hydrocarbons having condensation temperatures which could cause blockage of the mass flow conduit and damage the apparatus. Experimentally derived rates for various CH radical coupling reactions are available. See, for example, Ribiero, J. Florida State University 11 Jul. 2016 "Kinetics and Reaction Mechanisms for Methylidyne Radical Reactions with Small Hydrocarbons." While the conditions of these experiments differ from those of the present invention, this data reveals that cabyne radical recoupling can be rapid.

High dilution of the carbyne radical concentration within the mass flow conduit can only reduce the statistics of radical recombination. Alone, dilution is an inadequate countermeasure to carbyne radical recoupling. The method of the present invention exploits the paramagnetic properties of the carbyne radical as an effective radical recoupling countermeasure. Permanent magnets surround the mass flow conduit of both the radiolysis reactor output heat exchanger and the interface component. Because the unpaired valence electrons of the carbyne radical align with and couple to the magnetic fields of these permanent magnets, they are unavailable for chemical bond formation. The preferred permanent magnet material is iron nitride, $Fe_{16}N_2$ having the strongest magnetic field strength known for permanent magnets, 130 mega Gauss Oersteds—more than twice that of Nd based permanent magnets. Iron nitride magnets are commercially available from Niron Magnetics of Minneapolis MN.

Figure 3:
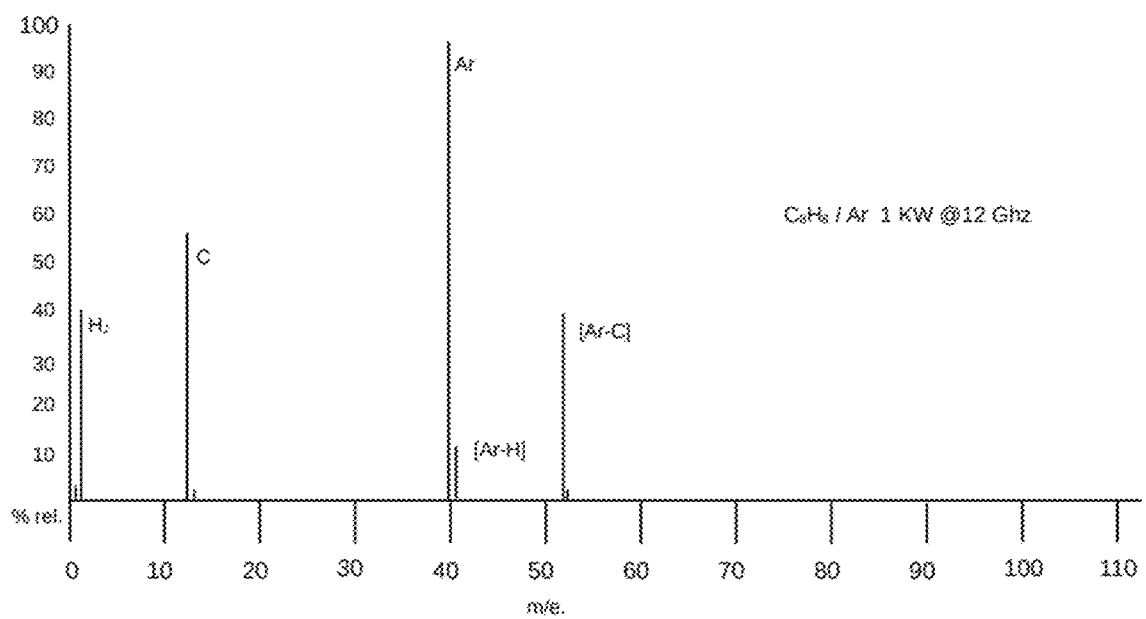
FIG. 3 shows the spectrum obtained for the microwave radiolysis of cubane ($C_8H_8$) in argon carrier gas.

Microwave power delivery to the radiolysis cavity during argon "burst gas" flush produces excited state argon or argon plasma. Magnetic susceptibility is not optimal within this elevated temperature "chaotic" environment necessitating some means to intercept the radical recombination which must inevitably occur under these conditions. Within the radiolysis reactor output heat exchanger, argon is in large excess compared to the carbyne radicals therein. Excited state argon produced by both radiolysis and flush events for the radiolysis over and above its high carbyne radical dilution is believed to provide some degree of radical recombination countermeasure by the formation of a meta-stable argon-carbon species. FIG. 3 shows the mass spectrum of the radiolysis of cubane ($C_8H_8$) in argon carrier gas conducted during development of the methods of the '295 and '917 patents. The peak at m/e 52 can plausibly be explained as a meta-stable argon carbide. A room temperature stable compound of argon within a fullerene structure ($Ar-C_{60}$) is known. Ab initio calculations predict the carbon-argon bond compound FArCCH to be stable. See Cohen et al., J. Chem. Phys., Vol. 119, #3, October 2003 available freely on-line as DOI: 10.1063/1.1613631. The high electron density of the excited state carbyne radical (:CH) would make this species reactive toward excited state argon.

The apparatus of the '775 patent uses a radical recombination strategy which differs from that of the present invention. Specifically, secondary radio frequency power is used to stimulate the carbyne radicals to a high energy anti-bonding state combined with secondary carrier gas injection into the mass flow path to provide a radical recombination countermeasure.

Apparatus

The apparatus of the present invention comprises 4 main components: carbyne radical generator; interface component; magnetic accelerator; diamond fabrication reactor. Each of these components requires one or more support systems which may be acquired from commercial sources and can be interfaced with and managed by a main computer running sense and control software.

Carbyne Radical Generator

This component generates carbyne radicals by microwave radiolysis of a mixture of acetylene diluted in argon carrier gas using 1-6 Kw of microwave energy at 2.45 Ghz within a cylinder, the radiolysis cavity, comprised of a microwave transparent material which is chemically inert and not structurally compromised by the heat generated by this process. The preferred material for this service is quartz which can be fabricated by glassblowers using a hydrogen torch for which large heavy wall cylinders are commercially available. See, for example, Glass Dynamics, Millville NJ.

The method of the present invention operates as a series of events rather than as a continuous flow process. Thus, the radiolysis cavity input and output are fitted with fast acting gate valves rated for service in chemically reactive and high temperature environments. Their ceramic gates are chemically and thermally stable well beyond 500° C. and provide no drag or turbulence to mass flow within the valve body. See, for example, Clippard of Cincinnati OH or iPolymer of Irvine CA.

In a non-limiting example of the radiolysis cavity of the present invention, microwave power is supplied to the radiolysis cavity from a magnetron amplifier by a waveguide antenna connected to the output of the magnetron amplifier through a high power, low loss coaxial cable. The wavelength of a 2.45 Ghz microwave is 12.24 cm. The dimensions of the wave guide determine its operating frequency range: high, low, and cut-off (the frequency limits for efficient microwave propagation). From the antenna art, the expressions for determining low frequency f/high frequency fh and cutoff frequency fc are given by the expressions: fc=C/2w and fh=1.89 fc; f/=1.25fc in where w is the width of the rectangle in meters and C is the speed of light in a vacuum. Accordingly, a rectangular dimension of 10 cm for the microwave power wave guide used with the radiolysis cavity of the apparatus of this invention provides an operating range of 1.9-2.8 Ghz with a cutoff frequency of 1.5 Ghz. The frequency band defined by fl and fh provides the most efficient microwave power propagation. The interior dimensions of the radiolysis cavity cylinder should be ~10 cm in length with a practical interior diameter of ~5 cm to provide a working volume of the radiolysis cavity of ~785 $cm^3$ which is defined by the input and output valves.

Within the wave guide passband (fl→fh) microwave energy propagates with highest efficiency, but some loss inevitably occurs. Typical commercially available wave guide and wave guide components are rated at 80-85% propagation efficiency. Because the microwave power delivered to the radiolysis cavity will be less than the output rating of the magnetron amplifier, it is necessary to operate the amplifier at a power level adjusted for the efficiency of the wave guide used. Microwave power meters suitable for such measurements are available from the same commercial suppliers for wave guides and amplifiers.

The preferred attachment of the wave guide to the radiolysis cavity is by a wave guide whose mouth conforms to the curvature of the radiolysis reactor cylinder. Alternatively, the quartz cylinder may be flattened on one side of the axial length at the time of manufacture such that the width of this flattened area corresponds to a linear wave guide antenna mouth. A microwave reflecting metal foil (Cu, Al, Au, Ag, Ni) extends around the radiolysis cavity from the wave guide-radiolys cavity junction. It is also possible to extend the microwave reflecting metal foil encircling the radiolysis reactor beyond the juncture of the waveguide mouth at the radiolysis reactor for the highest radiolysis efficiency. Forced air cooling of the radiolysis reactor, its valves, and the wave guide, must be used. The diameter of the radiolysis cavity provides a safe measure of mechanical strength and an adequate surface area for forced air cooling heat exchange. A smaller diameter would provide a smaller heat exchange surface area and a less practical working volume for the radiolysis cavity.

The output end of the radiolysis cavity should taper to the diameter of mass flow conduit through which the radiolytically produced carbyne radical-argon mixture exit into from the heat exchanger and transit through the interface component into the magnetic accelerator. A taper provides the least drag and turbulence to the mass of carbyne radicals and argon transiting from the radiolysis reactor into the heat exchanger.

The radiolysis cavity output heat exchanger is double walled cylinder having the volume between these walls evacuated, a Dewar, within which is deployed a mass flow conduit through which carbyne radicals diluted in argon carrier gas exiting the radiolysis cavity transit. A series of permanent magnets and PTFE spacers surround this mass flow conduit to provide the powerful magnetic field which is the countermeasure to carbyne radical recoupling. Low temperature methanol refrigerant circulates through this heat exchanger to dissipate the heat of the carbyne radical-argon mass within this section of the mass flow conduit. Refrigerant conduits within this Dewar are deployed within fluid and vacuum tight through wall spacers rated for methanol low temperature service. A non-limiting example of heat exchanger dimensions for ~11 liters of refrigerant is height=25 cm; radius=~12 cm providing ~250 $cm^2$ mass flow heat exchange surface.

A non-limiting example for the carbyne radical generator is shown in FIG. 4 which depicts this component as an axial slice view. Referring to FIG. 4, the carbyne radical generator comprises radiolysis cavity 1, microwave power delivery wave guide 2, output heat exchanger 3, and four normally closed gate valves 1b, 1c, 1h, and 1g. The gates of valves of 1b, 1c, and 1h are transverse to the input and output of mass flow for radiolysis cavity 1 operation (throttling) and receive actuation power from a valve control system (not shown). Valves 1b and 1c define the volume of radiolysis cavity 1a. The gate of gate valve 1g is parallel to radiolysis cavity input and output mass flow and connects to a dump tank (not shown) through its output conduit 1j and is used with isolation valve 1h for evacuation of components of the apparatus for shut down procedures. Radiolysis cavity 1a receives acetylene and argon carrier gas from a gas management system (not shown) through conduit 1d deployed at the input side of valve 1b. The output side of cavity 1a tapers at 1e to provide low-to-no drag and turbulence to the flow radiolysis products formed within and transiting from cavity 1a through output valve 1c. Support block 1f and dump valve 1g deployed between isolation valve 1h and output valve 1c define a mass flow conduit 1i through which the mass of radiolysis products formed within 1a transit from 1a through 1c and 1h into output heat exchanger 3.

Wave guide 2 provides microwave energy to cavity 1a from a magnetron amplifier (not shown) through coaxial power cable 2a connected to wave guide 2 at connection point 2b. The mouth of waveguide 2 conforms to the curvature of the radiolysis reaction chamber cylinder as shown at 2c. Deployed around radiolysis reaction chamber 1a is microwave reflecting metal screen 2d (Al, Cu, Au, Ni) which is secured to 1a and to high power microwave wave guide 2 by a foil tab 2e extending from microwave reflector 2d to attachment nub 2f of 2. A metal foil may be used for 2d, but the porosity of the screen is equally effective as a reflector and provides a heat exchange advantage over a foil Fans 4 represent the means by which forced air cooling of radiolysis cavity 1 and wave guide 2 is provided by a separate support system.

Output heat exchanger 3 is deployed between input side (top) support block 3a seal 3b and output side (bottom) support block 3c seal 3d. This heat exchanger is a dual walled toroidal chamber having the volume between its inner and out walls evacuated, a Dewar, which walls surround the entire volume of the heat exchanger (radially and axially). Dewar, 3e has through wall fluid and vacuum tight seals for refrigerant input and output conduits (seals not shown).

Refrigerant input conduit 3f and integrated temperature and flow sensing output conduit 3g provide means for refrigerant circulation through this heat exchanger from a refrigerant management system (not shown). Terminals 3h of conduit 3g provide means for data line connection to this system. The mass flow conduit which is an extension of 1i extends from 1h through 3b, 3a, 3e, 3d, and 3c to downstream components of the apparatus. The section of 1i within 3e is surrounded by an alternating series of permanent magnets 3f and PTFE spacers 3g. The magnetic fields of magnets 3f provide a countermeasure to carbyne radical recoupling.

Front bars B-2 and rear bars B-3 are secured to attachment points of blocks B-1, 3a, and 3c and waveguide 2 at points 2g to provide for mechanical assembly of 1, 2, and 3 as a secure framework for connecting this assembly to a support (not shown) using bolt points B-4 extending from blocks B-1, 3a, and 3c.

Interface Component

This component is deployed between the radiolysis cavity output heat exchanger and the input of the magnetic accelerator. It is tasked with heat dissipation of the carbyne radical-argon mass flow exiting the carbyne radical generator which transits through this component and into the magnetic accelerator input. Using the same refrigerant as that of the magnetic accelerator, the temperature differential between that of this mass flow and that of the magnetic accelerator can be reliably reduced for safe seal operation.

This component is a double walled cylinder having the volume between these walls evacuated, a Dewar. The mass flow conduit through which carbyne radicals diluted in argon carrier gas exiting the radiolysis cavity output heat exchanger transit extends through this component to the input of the magnetic accelerator. Carbon tetrafluoride refrigerant at ~100° K circulates through the volume of this component through refrigerant conduits deployed within fluid and vacuum tight through wall spacers which are rated for low temperature service by this refrigerant. The section of the mass flow conduit within this component is surrounded by a series of iron nitride permanent magnets and PTFE spacers to provide a countermeasure to carbyne radical recoupling. A secondary flow of cooled argon carrier gas is input to this mass flow through a conduit deployed at the input of this interface to provide additional heat dissipation for the carbyne radical-argon mixture within the mass flow conduit and to dilute the concentration of this mass flow for additional carbyne radical recoupling countermeasure service. Additional cooled argon carrier gas is provided through a conduit deployed at the output of this component into the input of the magnetic accelerator. The profile of the flow of cooled argon gas so provided by this component at both input and output ends provides low-to-no drag or turbulence to the carbyne radical-argon mass flow.

Figure 5:
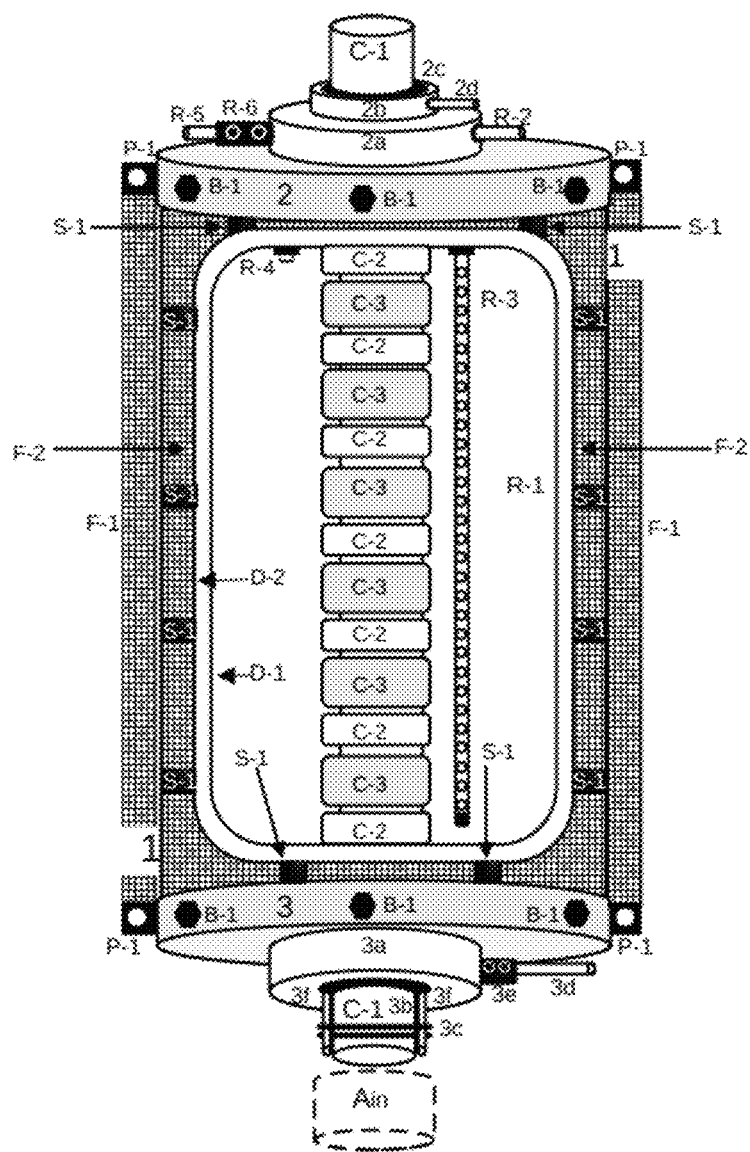
FIG. 5 shows the interface component.

FIG. 5 depicts a non-limiting example of an interface component as an axial slice view. Referring to FIG. 5, The mechanical enclosure of this component comprises cylinder 1 which extends into top (input side) and bottom (output side) end caps 2 and 3, respectively, secured by bolts B-1 which screw into threaded expansion bushings (not shown) deployed within cylinder 1. Bolt points P-1 integral with end caps 2 and 3 provide means to attach the Interface Component to a support frame (not shown). Dewar R-1 is defined by inner and outer walls D-1 and D-2, respectively having the volume between these walls evacuated. This evacuated volume encloses the entire refrigerant chamber axially and radially. Spacers S-1 extend from cylinder 1 and end caps 2 and 3 to outer Dewar wall D-2 to support and immobilize R-1 within the mechanical enclosure. Internal insulating foam jacket F-2 is deployed between D-2 and cylinder 1.

Carbon tetrafluoride refrigerant provided by the refrigerant management system (not shown) enters sealed input port R-2 mounted within top end cap 2 extension 2a. R-2 is connected to nozzle R-3 within extension 2a (connection not shown) to provide maximum crossflow heat exchange. The refrigerant exits through nozzle R-4 connected to sealed integrated flow and temperature sensing output port R-5 having terminals R-6 for data line connection to the external refrigerant management system (not shown). Nozzles R-3 and R-4 extend through a fluid and vacuum tight through wall seals (not shown) deployed between Dewar walls D-1 and D-2.

Mass flow conduit C-1 extends from the hydrocarbon radical generator output heat exchanger (not shown) into this interface component through secondary carrier gas manifold 2b port extending from top end cap 2a through seal 2c having input port 2d. Cooled argon carrier gas provided by an external gas management system (not shown) through manifold 2b is delivered into the mass flow within C-1 in a low-to-no drag and turbulence profile to dilute the mass flow within C-1 as a secondary radical recoupling countermeasure and heat dissipating agent.

Conduit C-1 extends through this interface component from top end cap 2 through bottom end cap 3 extension 3a seal 3b connecting to the input of the magnetic accelerator at seal and connection point 3c. An alternating series of PTFE spacers C-2 and high coercivity permanent magnets C-3, such as iron nitride permanent magnets, surround C-1 within refrigerant chamber R-1 to provide a countermeasure to radical recoupling.

Conduit C-1 extends from this interface component through bottom end cap 3 manifold extension 3a and seal 3b into the magnetic accelerator input represented by Ain at seal and connection point 3c. Manifold extension 3a receives additional secondary cooled argon carrier gas at sealed integrated temperature and flow sensing input port 3d having terminals 3e for data line connection to the external gas management system (not shown). Port 3d is connected to nozzles 3f within 3a (connection not shown) providing a low-to-no drag and turbulence gas injection profile for argon this argon gas flow into the magnetic accelerator.

As a non-limiting example, an interface component heat exchange Dewar having interior dimensions of 25 cm height and a 15 cm diameter will contain a static volume of refrigerant more than sufficient to reduce the temperature of the carbyne radical mass transiting through this section of the mass flow conduit to a safe seal operational temperature.

Magnetic Accelerator

The magnetic accelerator disclosed in the '775 patent is toroidal comprising many electromagnet segments integrated with countermeasure segments operating in switched drive mode wherein single segments are energized sequentially. Each electromagnet segment is a single layer coil. The accelerator of the present invention is significantly different that of the '775 patent in structure and in operation.

The magnetic accelerator of the present invention comprises a single electromagnet comprised of multiple layers of many coil turns. This electromagnet operates in continuous current supply mode rather than the switched drive current supply of the using multiple electromagnet segments of the '775 patent. Multi-layer electromagnet coils undergo radial stress induced by their own magnetic fields which can be mitigated by embedding the coil subsequent to winding. Powerful electromagnets having field strengths of 6-10 T can undergo self-induced stresses of ~140-400 atmospheres. Constant current operation and "ramping" of electromagnet current used by the present invention at start-up eliminates oscillatory stress and prevents magnetic "shock" to the electromagnet coil. Experimental data regarding this phenomenon is available: M.I.T. Publication 22.68J/264J, Feb. 27, 2003, (Lecture 4) "Superconducting Electromagnets—Magnetic Forces and Stresses", available freely on-line, a joint publication by Lawrence Berkeley National Laboratory (LBNL), European Organization for Nuclear Research (CERN), and the Large Hadron Collider (LHC), "Unit 10-Electromagnetic forces and stresses in superconducting accelerator magnets".

Axial forces are far lower and less problematic for an electromagnet. Axial stresses for electromagnets used by the Large Hadron Collider having magnetic fields>15 T are reported to be about $12.5 \times 10^4$ N, far lower than their radial stress counterparts. Axial recoil stress (Newton's third law of motion) will be very low due to the small mass resident within the electromagnet core and the extremely short transit times resulting from the acceleration of this small mass which is insignificant relative to the mass of the vertically oriented electromagnet.

For both types of electromagnet mechanical stress, embedding agents infiltrated into the electromagnet are effective for mitigating electromagnet self-induced stress. Infiltration of electromagnet devices with embedding agents is not limited to cryogenic electromagnets. It is a common industry practice. Electric power distribution transformer coils can undergo great mechanical stress and are infiltrated with embedding agents during coil fabrication as disclosed in U.S. Pat. No. 4,540,536.

Self-induced radial and axial electromagnet coil stress is far less problematic for the magnetic accelerator electromagnet of the present invention having low electromagnet current levels, <10 amperes, providing a magnetic field of ~0.1 T.

The preferred electromagnet core is comprised of a fluoropolymer (PTFE, FEP, FPA) which is cryogenically stable and chemically inert. Such polymers are melt-processable allowing for fabrication of complex shapes and high dimensional precision of such shapes. The choice of which of the many types of teflons can best be determined from data for the physical and chemical properties of these materials in cold, corrosive environments such as low earth orbit. See, for example, NASA Technical Memorandum 113153 "Investigations of Teflon Embrittlement on Spacecraft in Low Earth Orbit" June, 1997. PFA and FEP polymers are stable down to ~3.0° K and are preferred.

A 100×100 38 ga. copper magnet wire hollow fluoropolymer core inductor having both power tab leads on the same axial side of the coil can be an item of custom manufacture. See, for example, Prem Magnetics, Johnsville IL.

The magnetic accelerator of the present invention is a cryostat comprising two concentric cylindrical refrigerant chambers deployed within a mechanical enclosure. The central chamber is the electromagnet refrigerant chamber. The chamber surrounding the electromagnet chamber is the environmental heat shield. Layers of resilient insulating polyurethane foam are deployed between these two chambers and between the environmental heat shield and the mechanical enclosure which, itself, is clad externally with a rigid polyurethane foam for both additional thermal isolation and shock and impact protection. Resilient polyurethane foams deployed internally have very low thermal conductivity particularly when applied with minimal or no stress. Rigid polyurethane foams used for the external foam layer of the mechanical enclosure provide good insulation and high mechanical strength against impact. See, for example, Demharter, A., Cryogenics, Vol, 38, issue 1, January 1988, pp. 113-117. Experimentally derived data for the thermal conductivity of 96 kg/m$^3$ polyurethane foam discloses a thermal conductivity of ~26 mW/m$^2$/second. Jacketing and lining an enclosure with this foam significantly reduces the heat shield environmental heat load. See National Bureau of Standards Publication NBSIR 84-3011, 4/1984, "Thermal and Mechanical Properties of Polyurethane Foams and Survey of Insulating Concretes at Cryogenic Temperatures"). Non-rigid polyurethane foam used for enclosure jacket and lining and between the cryostat end covers should not be compressed as this material provides maximum thermal isolation unstressed.

The electromagnet is deployed within a refrigerant chamber through which the $CF_4$ refrigerant circulates to dissipate heat generated by the electromagnet and the power posts connected to power tab leads of the electromagnet. The majority of heat which must be dissipated is an artifact of the power posts deployed within the electromagnet refrigerant chamber. The electrical resistance of the cables carrying current form the magnet power supply generates this heat, and this heat propagates through the power supply cables to the power posts. The maximum current required for the non-limiting exemplary magnetic accelerator electromagnet of the present invention is less than 10 Amperes which is within power transmission specifications for 12 ga. copper wire. Using 2 meter long 12 ga. electromagnet power supply cables carrying ~10 Amperes of current, power post and electromagnet generated heat will not exceed ~5 W/second.

In addition to heat generated internally electromagnet and power post electrical resistance, environmental heat must be dissipated for which the environmental heat shield refrigerant chamber is tasked. Publicly available data from the Large Hadron Collider ("LHC") directed to accelerator heat shield refrigerant chambers infers that "leak" of environmental heat from the heat shield to the electromagnet refrigerant chamber is insignificant where adequate heat shield refrigerant is used along with appropriate insulation measures. At the LHC, environmental heat load is taken at 0.05 mWatt/sec/m$^2$. This is the measure of external heat which conducted into the accelerator cryostat through the mechanical enclosure and intervening foam layers into the heat shield refrigerant chamber.

Nalgene (LLDPE) is used in chemical laboratories as Dewars used for liquid nitrogen and similar cold baths due to its strength, impact resistance, and low thermal conductivity, 0.35-0.45 W/m/° K, at ambient temperatures Cylindrical nalgene tanks and related components are available commercially in dimensions exceeding those required by the non-limiting, exemplary magnetic accelerator of the present invention making nalgene the preferred material for the mechanical enclosure.

Fluoropolymers (PTFE, FEP, FFPA) can be melt processed to make simple and complex shaped products having dimensions beyond those required by the exemplary magnetic accelerator of the present invention which are available as articles of commerce. This commercial availability and the stability of fluoropolymers such as PTFE, FEP, PFA, PVDF and ETFE at cryogenic temperatures as low as that of liquid helium mandate their use for both magnetic accelerator refrigerant chambers. Fluoropolymer cryogenic temperature thermal conductivities range from 0.046-0.192 W/m °K. Mechanical properties of strength, coefficients of expansion, and electrical resistance are adequate for service as the materials of the electromagnet refrigerant chamber. See, for example, International Association of Plastics Distribution Fluorochemical Properties Chart, available freely on-line.

The design, fabrication, implementation and operation of the magnetic accelerator cryostat and electromagnet deployed within this cryostat requires that this device be simple, reliable, and convenient to access for assembly and for disassembly repair; maintenance; replacement and upgrade. Access to all refrigerant chamber components is from one side, the input side, simplifying repair, routine maintenance, modification or upgrade, and replacement. The entire cryostat should be easily removed from its mechanical enclosure which comprises a surround and input side and output side covers secured to the mechanical surround. To enable this access, a host-guest design strategy is used. The central cylindrical structure, the electromagnet refrigerant chamber, can be removed from its surrounding concentric cylinders, the heat shield deployed within the mechanical enclosure.

The method of this invention using the first embodiment reactor requires removal of the diamond fabrication reactor for conducting the second step process, fracture of the first step composite stack of diamond monolayers interspersed with unreacted DHB. Accordingly, a normally closed gate valve is deployed within the bottom end cap. The electromagnet core extends into and terminates within this gate valve. An extension of the mass flow conduit continues from the output side of this valve. This gate valve provides means for environmental isolation of the magnetic accelerator and upstream components of the apparatus when reactor separation is performed. This extension of the mass flow conduit extends through the reactor connection flange through a seal integral with this flange. This flange is connected to standoffs screwed into threads within the reactor top end cap. The flange connects to threads within the standoffs by bolts which are counter sunk into flange bolt points. The gap between the bottom end cap and the flange is filled with the resilient polyurethane foam insulation used for the external jacket of the magnetic accelerator mechanical enclosure. This same arrangement of isolation valve and connection flange is used with the second embodiment reactor. In this case, separation of the magnetic accelerator from the reactor is for service of the reactor.

Figure 6:
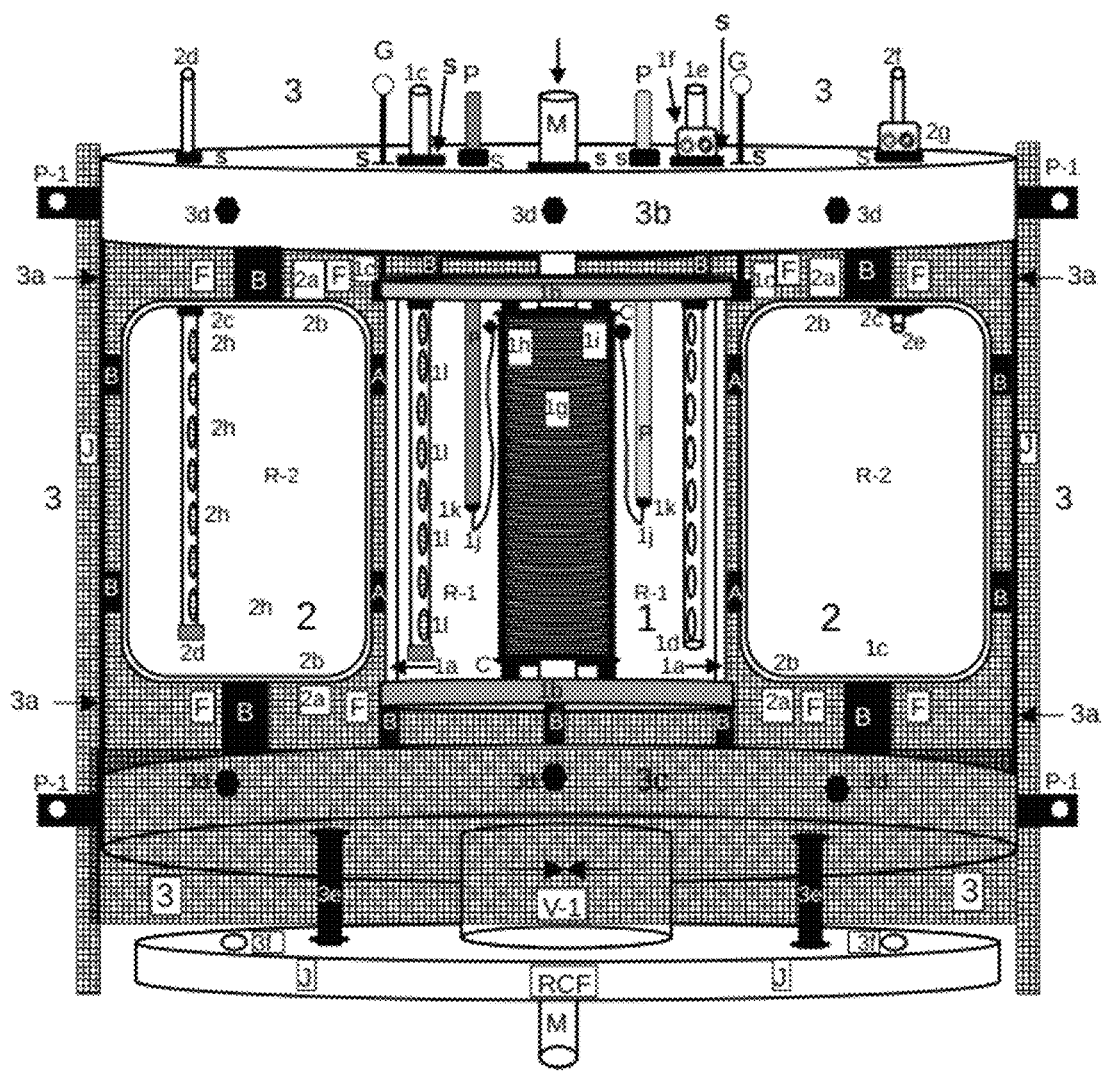
FIG. 6 shows the magnetic accelerator.

FIG. 6 shows a non-limiting exemplary magnetic accelerator of the present invention as an axial slice view. The magnetic accelerator is an electromagnet deployed within a cryostat comprising the electromagnet within refrigerant chamber 1 which is surrounded by environmental heat shield refrigerant chamber 2. These concentric chambers are deployed within a mechanical enclosure 3 using a host-guest design strategy to facilitate access for modifications and/or repair of the electromagnet. Chamber 1, the "guest" is removably deployed from within chamber 2, the "host". The heat shield refrigerant chamber is a toroidal Dewar which may be manufactured by glass blowers from borosilicate glass used routinely for liquid nitrogen Dewars in chemical laboratories making it sufficiently stable for cryogenic service as the heat shield refrigerant chamber. The toroidal Dewar is easier to fabricate using borosilicate glass than it would be using a fluoropolymer. Through wall bushing seals are fabricated into the toroidal Dewar during manufacture.

Referring to FIG. 6, mechanical enclosure 3 is an open cylinder 3a enclosed by top (input side) end cap 3b and bottom (output side) end cap 3c. End caps 3b and 3c are secured to 3a by fasteners 3d screwed into threaded expansion bushings (not shown) within 3a. Mount points P-1 extending from end caps 3b and 3c provide means for bolting the magnetic accelerator to a support frame (not shown). Bushings B connected to and extending from 3a and end caps 3b and 3c support and immobilize heat shield chamber 2 and magnetic accelerator 1. Bushings A affixed to chamber 2 fix chamber 1 in place. Insulating polyurethane foam packing F surrounds chambers 1 and 2 on all sides extending axially and radially throughout the entire volume within enclosure 3. External polyurethane foam jacket J surrounds the exterior of enclosure 3 and endcaps 3b and 3c providing additional thermal insulation and impact shock protection. Struts 3e fabricated into 3c connect 3c to reactor connection flange RCF. Bolt holes 3f in RCF provide means for attachment of the magnetic accelerator to the diamond fabrication reactor (not shown). Isolation valve V-1 deployed at the output of the magnetic accelerator extends through 3c and reactor connection flange RCF and into the reactor (not shown). V-1 provides means for environmental isolation of the magnetic accelerator and upstream components of the apparatus during reactor removal and/or replacement procedures. Electromagnet core M extends into the input side of V-1 (not shown), and extends from the output side of V-1 as the mass flow conduit for transit of the kinetically energized carbyne radicals exiting the magnetic accelerator into the diamond fabrication reactor (not shown).

Seals S deployed within end cap 3b provide fluid and vacuum tight seals for mass flow conduit M, refrigerant input and output conduits for chambers 1 (1c and 1e) and 2 (2d and 2f), magnetic accelerator grasp points G, and power posts P.

Toroidal Dewar environmental heat shield refrigerant chamber 2 has the volume between its outer wall 2a and inner wall 2b evacuated. Through wall bushing seals 2c provide fluid and vacuum tight seal for refrigerant input conduit 2d and exit nozzle 2e extending from integrated flow and temperature sensing output conduit 2f having terminals 2g for data line connection to a refrigerant management system (not shown). Output orifices 2h of conduit 2d direct refrigerant cross flow throughout chamber 2 to exit nozzle 2e.

Magnetic accelerator refrigerant chamber 1 is an axial Dewar, 1a, having the volume between its inner and out walls, 1a, evacuated. End caps 1b close off axial ends of Dewar 1a attached to 1b by fluid and vacuum tight PTFE O-ring seals (not shown). Through wall bushings 1b provide fluid and vacuum tight seal for refrigerant input conduit 1c and exit nozzle 1d extending from integrated flow and temperature sensing output conduit 1e having terminals 1f for data line connection to a refrigerant management system (not shown). Electromagnet 1g has first and last coil terminations 1h and 1i for connection to conductors 1j which connect to attachment points 1k on power posts P. Electromagnet 1g is supported by input side and output coil stops C extending from end caps 1b. Refrigerant heat dissipation for electromagnet and power post is optimized by transverse flow directed by output orifices 11 on input conduit 1c. Mass flow conduit M is the electromagnet core about which coil 1g is wound. Conduit M extends from the input side interface component (not shown) through the electromagnet and into the output side diamond fabrication reactor (not shown). Grasp points G are screwed into threads within blocks 1c attached to end caps 1b.

In a non-limiting example, a volume of ~1 liter of $CF_4$ for the electromagnet refrigerant chamber is more than sufficient to dissipate steady state internally generated from power post and electromagnet electrical resistance. This static volume can dissipate ~2230 W/mol/sec at 100° K in the event of refrigerant supply failure or electromagnet power supply malfunction to provide sufficient time for an emergency shutdown. Dynamic heat dissipation at a refrigerant flow rate of ~5 ml/second can dissipate more than 10 W/sec of heat. Fluid contact surface area defines efficiency for heat dissipation which requires that radial surface contact be maximized as much as is practical as shown in FIG. 6 using input and output refrigerant nozzle profiles which match that of the electromagnet to provide optimal refrigerant flow over the axial and radial surfaces of the electromagnet and power posts. An electromagnet refrigerant chamber having inner dimensions 15 cm×12 cm (length× diameter) will provide a static refrigerant volume of ~1.3 liter and fluid surface contact area of ~790 $cm^3$. Standard extrusion cryogenic PTFE pipe stock (3 mm wall) is commercially available for this purpose. The Dewar is formed from 14 cm outer diameter 3 mm wall standard PTFE tubing stock and custom extruded closed end PTFE tubing pieces using 14 mm inner diameter PTFE O-rings. This Dewar should be fabricated by manufacturers of fluoropolymer stock tubing and pipes and custom PTFE components such as Ametek of Nesquehoning PA.

The toroidal heat shield refrigerant chamber may be fabricated by a glassblower from rounded square and rectangular borosilicate glass tubing as Duran borosilicate glass preferred for cryogenic temperature service having heights of 15 cm and 14 cm. See, for example, Glass Dynamics and Ace Glass both of Vineland NJ. The heat shield volume will be ~21.8 liters Using low thermal conductivity materials such as Nalgene (LLDPE) for the mechanical enclosure having inner and outer layers of insulating polyurethane, the heat dissipation demands upon the environmental heat shield are small deferring to the LHC figure of 0.05 mWatt/sec/m². Including additional layers of insulating polyurethane foam deployed between the mechanical enclosure and the heat shield refrigerant chamber, the inner diameter of this exemplary magnetic accelerator cryostat will be ~50 cm having an axial surface area of ~2,356 cm² and a radial surface area (top and bottom end caps) of 3927 cm². The axial environmental heat load and the radial environment heat loads are insignificant with respect to the large static refrigerant volume of the heat shield. That portion of environmental heat conducted through the polyurethane foam of the mechanical enclosure end caps which must be dissipated by electromagnet refrigerant chamber is ~6 J/second which is insignificant with respect to the static refrigerant volume of the electromagnet cryostat and within this exemplary cryostat's dynamic heat dissipation capability. The total quantity of environmental heat which must be dissipated would NOT be insignificant using a magnetic accelerator design which dispensed with the environmental heat shield altogether using only large amounts of insulating foam and a very high inventory static refrigerant volume and/or a robust refrigerant circulating flow rate. The exemplary magnetic accelerator cryostat design of the present invention provides a large safety margin which is otherwise unavailable. The management and supply system for the $CF_4$ is tasked with providing this refrigerant to both the magnetic accelerator and the interface component and relies upon the high inventory strategy of the magnetic accelerator cryostat to ensure reliable heat dissipation operating at relatively low circulation and main reservoir cooling service prolonging service life and minimizing risk of system failure. LHC cryogenic refrigerant inventory management is disclosed in S. Claudet et al., LHC Porject Report 1171, Jul. 21, 2008 ICEC 22-ICMC Conference, *CRYOGENIC HEAT LOAD AND REFRIGERATION CAPACITY MANAGEMENT AT THE LARGE HADRON COLLIDER (LHC)*.

Diamond Fabrication Reactors

There are two embodiments for diamond fabrication reactors for practicing the method of the present invention. Both reactors must provide services and means for conducting the procedures of step 1 composite fabrication, step 2 nanodiamond particle formation, and step 3, isolation and recovery of the nanodiamond particles formed in the step 2 procedure. These services are:

1) means to support and cool the diamond fabrication deposition substrate;
2) means to provide DHB to the diamond fabrication deposition substrate;
3) means to monitor and control the temperature of the diamond fabrication substrate;
4) means to connect to the output of the magnetic accelerator having fluid and vacuum tight seal from environmental incursion into the fabrication reactor;
5) means to provide evacuation of the reactor;
6) means to provide inert gas into the reactor;
7) means to monitor and control pressure and/or vacuum within the reactor;
8) means to monitor the progress and character of the diamond forming reaction at the diamond fabrication deposition substrate in real time;
9) means to form nanodiamond particles;
10) means for isolation, transfer, and recovery of the nanodiamond particle product.

First Embodiment Reactor

The first embodiment reactor provides the disclosed services and means using a single reactor body and two different tops. The first top, the fabrication top, is configured for the step 1 procedure of the method of the present invention wherein a composite product comprising many diamond monolayers interspersed with unreacted DHB between diamond monolayers is formed. The second top provides the means by which the step 2 procedure is conducted for nanodiamond particle formation from the step 1 composite. Thereafter, this top is configured for the step 3 isolation, transfer, and recovery. For commercialization, only 2 reactor bodies and two types tops are required. Nanodiamond formation and subsequent isolation, transfer, and recovery require less time than does formation of the composite of the step 1 procedure. More simply, a first reactor (reactor body fitted with the fabrication top) is separated from the magnetic accelerator, and the fabrication top is replaced with the second top. A second reactor body is fitted with the fabrication top and re-attached to the magnetic accelerator for a new product run. During this "new" step 1 procedure, steps 2 and 3 are conducted within the first reactor body fitted with the second step top. Thus, a continuous nanodiamond fabrication operation can continue for as long as the precursors (acetylene and DHB) are on hand using only two reactor bodies and the 2 different tops.

Reactor Body

Figure 7:
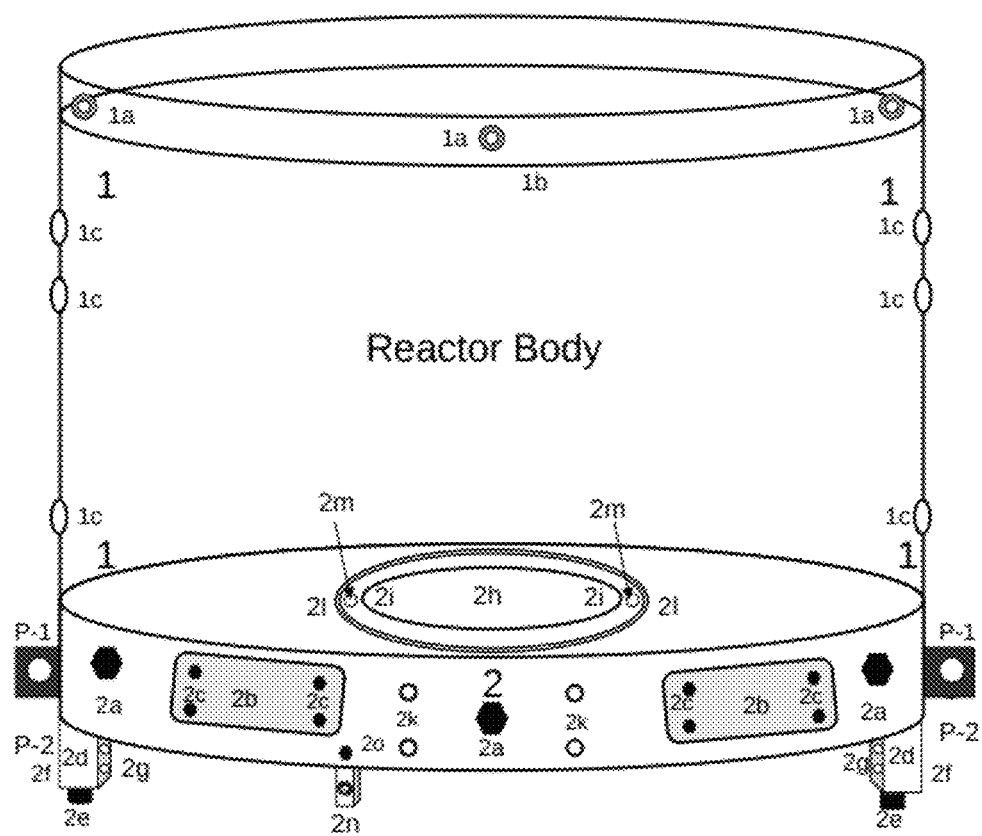
FIG. 7 shows the diamond fabrication reactor body comprising an open cylinder having the bottom end cap attached to this cylinder.

The reactor body comprises an open top cylinder and bottom end cap. The bottom end cap receives a support block for the diamond fabrication deposition substrate which is also the chamber through which refrigerant circulates to cool the fabrication substrate and the DHB deposited upon this substrate to DHB solidus temperature. This component provides service for all three steps of the method of the present invention. FIG. 7 shows a non-limiting example of the reactor body without this support block within the bottom end cap.

Referring to FIG. 7, the reactor body comprises an open cylinder 1 having holes formed in both axial ends 1a, O-rings 1b deployed around this cylinder at both axial ends (bottom O-ring not shown), and bottom end cap 2. Holes are formed in cylinder 1 into which are inserted silicone rubber grommets 1c which provide fluid and vacuum tight seal for components inserted into these grommets. These grommets are sized for their intended use components. Threaded expansion bushings (not shown) are inserted into holes 1a for securing top and bottom end caps to cylinder 1 with screw tension force sufficient to provide fluid and vacuum tight seal by compression of O-rings 1a. The most practical material for 1 is heavy wall borosilicate glass pipe which is used for fabrication of large volume chemical reactors subjected to high vacuum and moderate pressures and can be modified by a glass blower.

Bottom end cap 2 is secured around cylinder 1 and O-ring 1b, and bolts 2a are screwed into bottom end holes 1a for fluid and vacuum tight seal. Attachment points P-1 extending from the sides of bottom end cap 2 provide means to bolt the reactor to a support frame (not shown). Access to internal components within 2 is provided by slots fabricated into 2 covered by access plates 2b secured to 2 by bolts 2c screwed into threads fabricated into the sides of 2. Attachment points P-1 extending from 2 provide means to bolt the fully assembled reactor to a support frame (not shown). Stand attachment points P-2 comprise blocks 2f fastened to 2 by bolts 2e which extend through 2f to threads within 2 (not shown). Holes 2g fabricated into 2g provide means for bolting a stand (not shown) to blocks 2g. Aperture 2h fabricated into 2 receives the support block not shown) which is deployed in O-ring 2i within 2h. Holes 2k fabricated into 2 match threads fabricated into the support block (not shown) for securing it to bottom end cap 2. Moat 21 provides means for confining, draining, and recovering liquified DHB through drain tube orifices 2m within this moat which extend within 2 to quick connect-disconnect fluid line fitting 2n extending from the bottom of 2 for connection to an external DHB management system (not shown). Fitting 2n is secured to 2 by bolt 20 inserted into a hole fabricated into 2 matching the threads of 21 which bolt 20 is screwed into these threads and tightened.

Bottom end cap 2 is load bearing and is fabricated from the same high strength and fracture toughness material as are bolts through 2k which secure the support block (not shown) to bottom end cap 2. The support block, bottom end cap, and bolts securing this component to the bottom end cap must be able to withstand the strike force used to fracture the step 1 composite comprised of many diamond monolayers wetted with residual DHB, and this is the primary limitation for the materials from which these components block can be fabricated. Maraging steels are known for fracture toughess of ~1400-2400 Mpa and are commercially available in a wide variety of stock shapes and sizes as are fabrication services required for shaping and welding the components which comprise the support block. The preferred alloy for the support block is 18Ni2400 (Mpa=2400): 17.5% Ni; 12.5% Co; 3.75% Mo; 1.8% Ti; 0.15% Ni. In addition to high strength and fracture toughness, this alloy has a very low thermal expansion/contraction coefficient (~10.1 μm/m° C.) and adequate low temperature thermal conductivity (~25.3 W/mK) making it adequate for service as the refrigerant chamber. See International Molybdenum Association; https://www.imoa.info).

The diamond fabrication deposition substrate must comprise a high fracture toughness material which is compatible with diamond. Rock bits having diamond coated end effectors are fabricated from commercially available tungsten carbide powder impregnated with cobalt metal particles which is the preferred ceramic material for fabrication of the diamond fabrication deposition substrate. See, for example D. Wheeler, Lubricants 2018, 6, 84; DOI: 10.3390/lubricants6030084.

Step: 1 Diamond Fabrication Reactor Configuration

Figure 8:
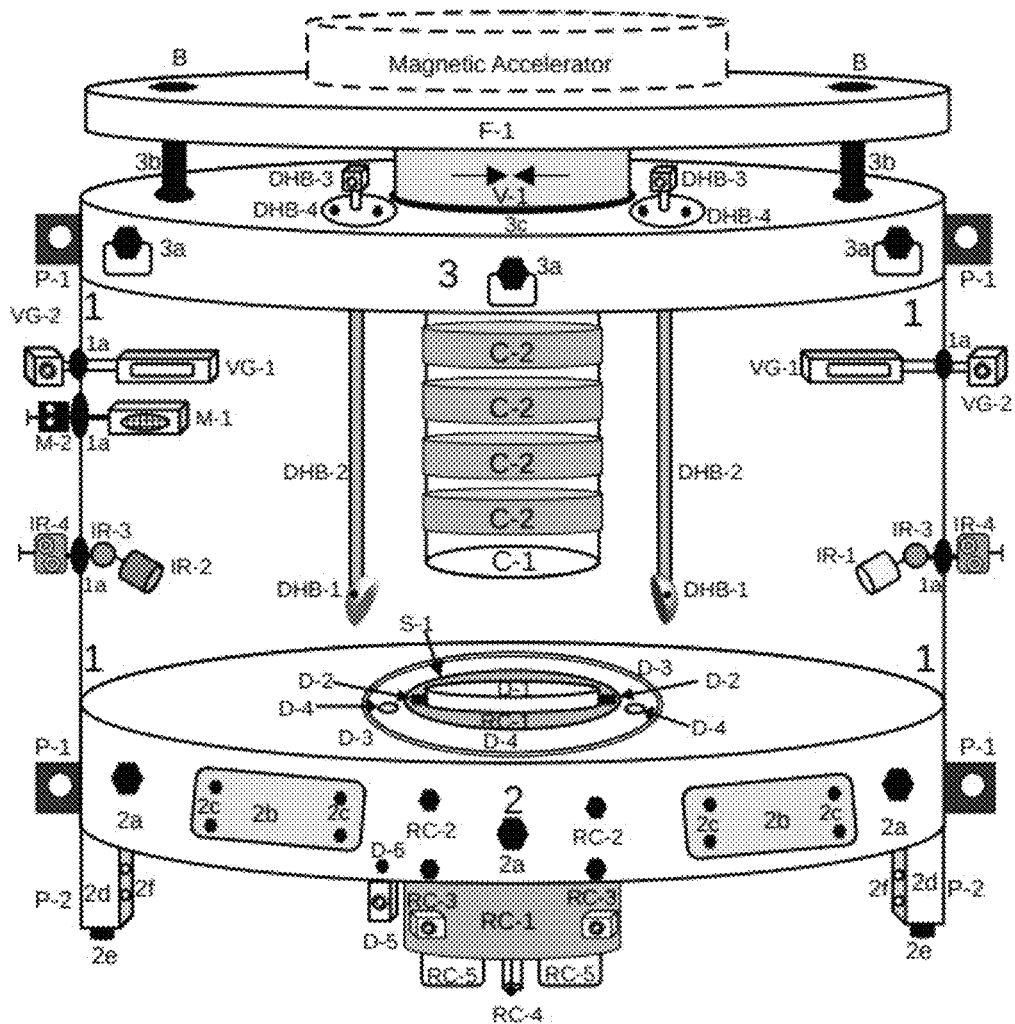
FIG. 8 shows the diamond fabrication reactor configured for fabrication of a composite comprising many diamond monolayers interspersed with excess dihydrobenzvalene between the diamond mono layers.

FIG. 8 shows a non-limiting of a fully assembled reactor configured for the step 1 procedure, formation of the composite "stack" of diamond monolayers interspersed with DHB between each diamond monolayer having the support block deployed within the bottom end cap of the reactor body. The top end cap is designed for conducting the step 1 composite formation procedure.

Referring to FIG. 8, the reactor configured for diamond monolayer formation comprises cylinder 1, bottom end cap 2, and top end cap 3. Top and bottom end caps 3 and 2 are secured to 1 by bolts 3a and 2a, respectively screwed into threaded expansion grommets (not shown) inserted into holes fabricated into 1 to receive these grommets. O-rings deployed around the top and bottom ends of 1 (not shown) between these end caps provide fluid and vacuum tight seals due to screw force tension of bolts 2a and 3a. Attachment points P-1 extending from 2 and 3 provide means for bolting the reactor to a support frame (not shown). Stand attachment points P-2 comprise blocks 2d secured to the bottom of 2 by through-bolts 2e screwed into threads fabricated into the bottom of 2. A tripod stand (not shown) is fastened to blocks 2d by bolts inserted into holes 2f fabricated into 2d to support the reactor when it is separated from the magnetic accelerator. Access to internal components of 2 is provided by openings fabricated into 2 covered by access plates 2b and secured to 2 by bolts 2c screwed into threads within 2.

The reactor is attached to magnetic accelerator output side flange F-1 by threaded posts 3b extending from 3 into bolt holes in F-1 secured by bolts B screwed into these threads. Normally closed isolation valve V-1 actuated by an external valve controller (not shown) extends from the magnetic accelerator through F-1 into 3 through seal 3c. The electromagnet core of the magnetic accelerator (not shown) extends into the input side of V-1 and extends into the reactor from the output side of V-1 as mass flow conduit C-1 which is surrounded by permanent magnets C-2 comprised of Nd or iron nitride ($Fe_{16}N_2$, "Niron") to provide a countermeasure to radical recoupling of the kinetically energized carbyne radicals transiting from the magnetic accelerator into the reactor as well as some degree of control over radial radical distribution for these carbyne radicals.

Pressurized liquid DHB is received form an external DHB management system (not shown) at quick connect-disconnect fluid line fitting DHB-3 having conduit DHB-2 extending from it to adjustable nozzle DHB-1 which sprays liquid DHB onto diamond fabrication substrate D-1 cooled to DHB solidus temperature and supported by refrigerant chamber RC-1. Fitting DHB-3 integral with DHB-2 is secured to 2 by bolt flange DHB-4 which has a silicone rubber gasket (not shown) deployed between it and 2 providing a fluid and vacuum tight seal preventing environmental incursion into the reactor. The unitized assembly of DHB-1, DHB-2, DHB-3, and DHB-4 may be removed from or inserted into 2 using the flange bolts.

RC-1, the refrigerant chamber/support block, deployed within and extending through bottom end cap 2 within seal S-1 is secured to 2 by bolts RC-2 which extend through holes matching threads fabricated into RC-1 and are screwed into these threads. Quick connect-disconnect fluid line fittings RC-3 receive the refrigerant which circulates through RC-1 from an external refrigerant management system (not shown). An optical semiconductor temperature sensor deployed at the tip of an optical fiber within RC-1 (not shown) provides refrigerant temperature and flow data to the external refrigerant management system (not shown) at fiber optic coupler RC-4 deployed at the bottom of RC-1. Folding grasp points RC-5 provide means to insert and/or remove RC-1 into/from 2 using bolts RC-2.

Diamond fabrication substrate D-1 supported and cooled by RC-1 is fixed in place by nubs D-2 extending from the top of RC-1. Liquified DHB is drained from the composite stack of diamond monolayers interspersed with excess, unreacted, DHB into moat D-3 surrounding RC-1 through drain conduits D-4 within D-3 which extend from D-3 through 2 (not shown) to quick connect-disconnect fluid line fitting for D-5 recovery and recyling by an external DHB management system (not shown). Fitting D-5 is secured to 2 by bolt D-6 inserted into a hole in 2 matching threads in D-5. Moat D-3 and conduits D-4 are not in contact with RC-1 and are not cooled by the refrigerant circulating within RC-1.

Reactor evacuation and inert gas input is provided by vacuum-gas manifolds VG-1 extending through seal 1 to quick connect-disconnect fluid line coupling VG-2. Manometric sensor M-1 extending through seal 1a to terminal block M-2 provides reactor vacuum and pressure data to the external gas management system (not shown) which provides vacuum and inert gas service to the reactor through manifolds VG-1. Infrared emitter IR-1 and receiver IR-2 deployed in seals 1a have pivots IR-3 for precise aim and have terminals IR-4 for data line connection to an external Reflectance FTIR (Fourier Transform Infrared) spectrometer (not shown) for real time monitoring of diamond monolayer formation. Terminals M-2, VG-2, and IR-4 are spring loaded push-connect-disconnect devices.

Step: 2 Nanodiamond Particle Fabrication Reactor Configuration

Figure 9:
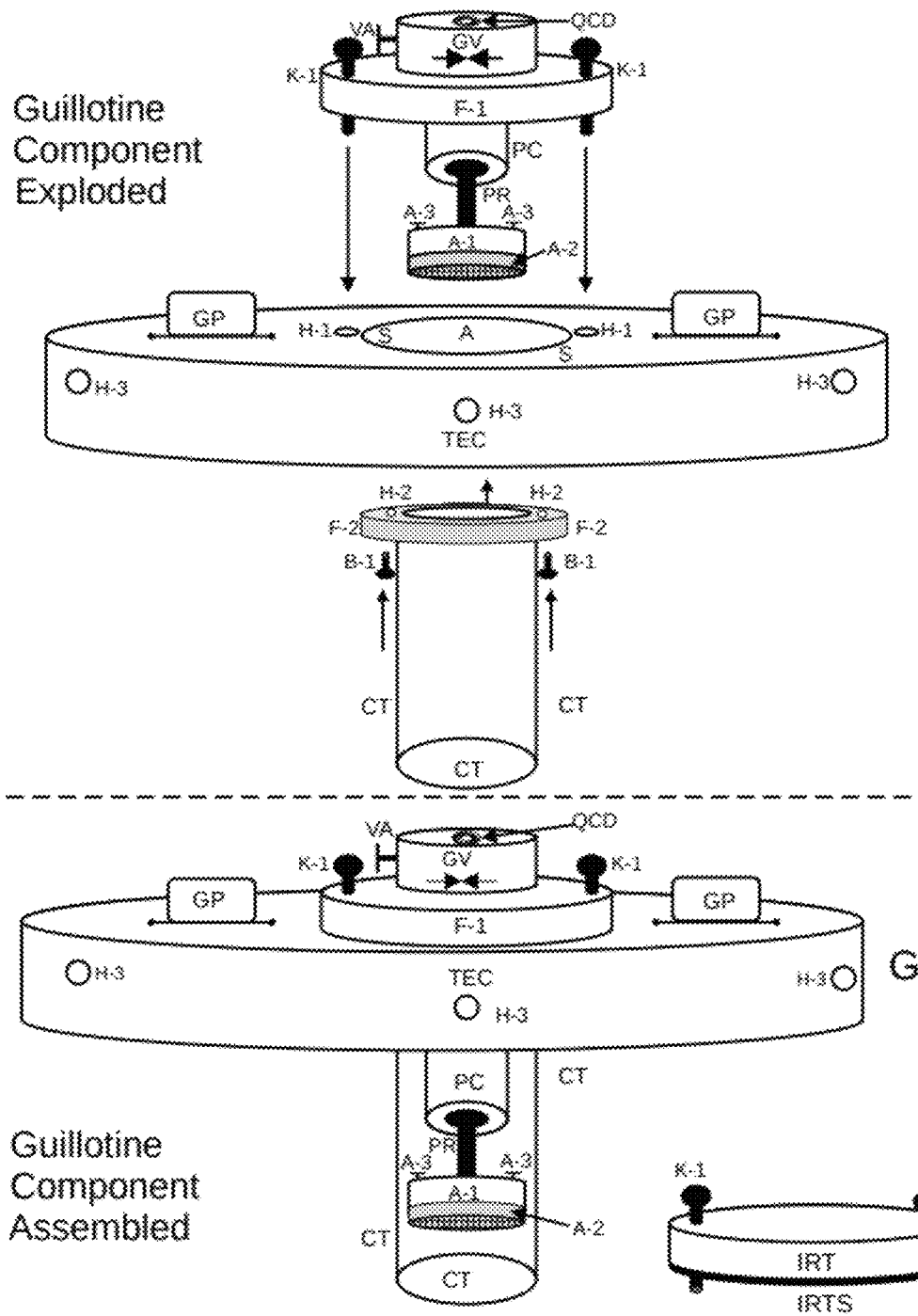
FIG. 9 shows the assembly of a pneumatically driven Guillotine top used for step 2 nanodiamond formation in a reactor top end cap.

Steps 2 and 3 are conducted in the reactor used for step 1 but with a different top which top provides service for both steps 2 and 3. This top has a confinement tube attached to the bottom of the top, and the confinement tube extends to the surface of the fabrication substrate D-1 to surround and confine nanodiamond particles produced in step 2. For step 2, a Guillotine apparatus is connected to this top. FIG. 9 shows the assembly of these components to this top as ans exploded view and a fully assembled view.

Referring to FIG. 9 as the assembled view, Guillotine top G comprises top end cap TEC having folding grasp points GP fabricated into this top. Deployed centrally within TEC is a normally closed, manually actuated gate valve GV having flange F-1 integral with the valve body. Threaded keys K-1 extend through holes in F-1 matching threads fabricated into TEC for securing GV to TEC by screwing keys K-1 into these threads. Valve GV is actuated manually by spring loaded valve actuator VA. Valve GV receives compressed air from an external compressed air source (not shown) at quick connect-disconnect fluid line fitting QCD. Valve GV is an input side extension of t single stage pneumatic piston PC having a piston rod PR which is threaded at is end to screw into threads in anvil A-1 (connection not shown) having nanomachined strike face A-2 connected to it by bolts A-3 which screw into threads fabricated into A-2 (not shown). Confinement tube CT comprises a borosilicate glass tube connected to a metal flange by a glass-to-metal seal such as a Kovar sealing ring. Such components are commercially available. See, for example, Ace Glass of Vineland NJ. CT extends from the bottom of TEC surrounding the assembly of A-1, A-2, and PR. The assembled top is secured to the open reactor cylinder 1 by bolts inserted into holes H-3 and screwed into threaded expansion bushings within the top of cylinder 1.

Referring to FIG. 9 as the exploded view, the assembly of all components which comprise Guillotine G is shown. Guillotine top G is assembled as follows.

To connect confinement tube CT to TEC, bolts B-1 are inserted into holes F-2 of flange F-1, and this assembly is secured to the bottom of TEC by screwing bolts B-1 into threads fabricated into the bottom of TEC (not shown) matching holes F-2.

The Guillotine is assembled by connecting nanomachined strike face A-2 to anvil A-1 by bolts A-3 screwed into threads fabricated into A-2 (connection not shown). Anvil A-1 is then connected to PR by matching male and female threads of A-1 and PR (not shown). This assembly comprising GV, PC, PR, and A-1 is pushed down onto TEC to move PR through the central aperture in TEC having O-ring seal S deployed in this aperture. Threaded keys K-1 are screwed into H-1 forming a fluid and vacuum tight seal with S by screw force pressure. Guillotine top G so assembled can then be secured to the reactor body by bolts (now shown) inserted into holes H-3 which are screwed into threaded expansion bushings in the reactor body (not shown).

Figure 11:
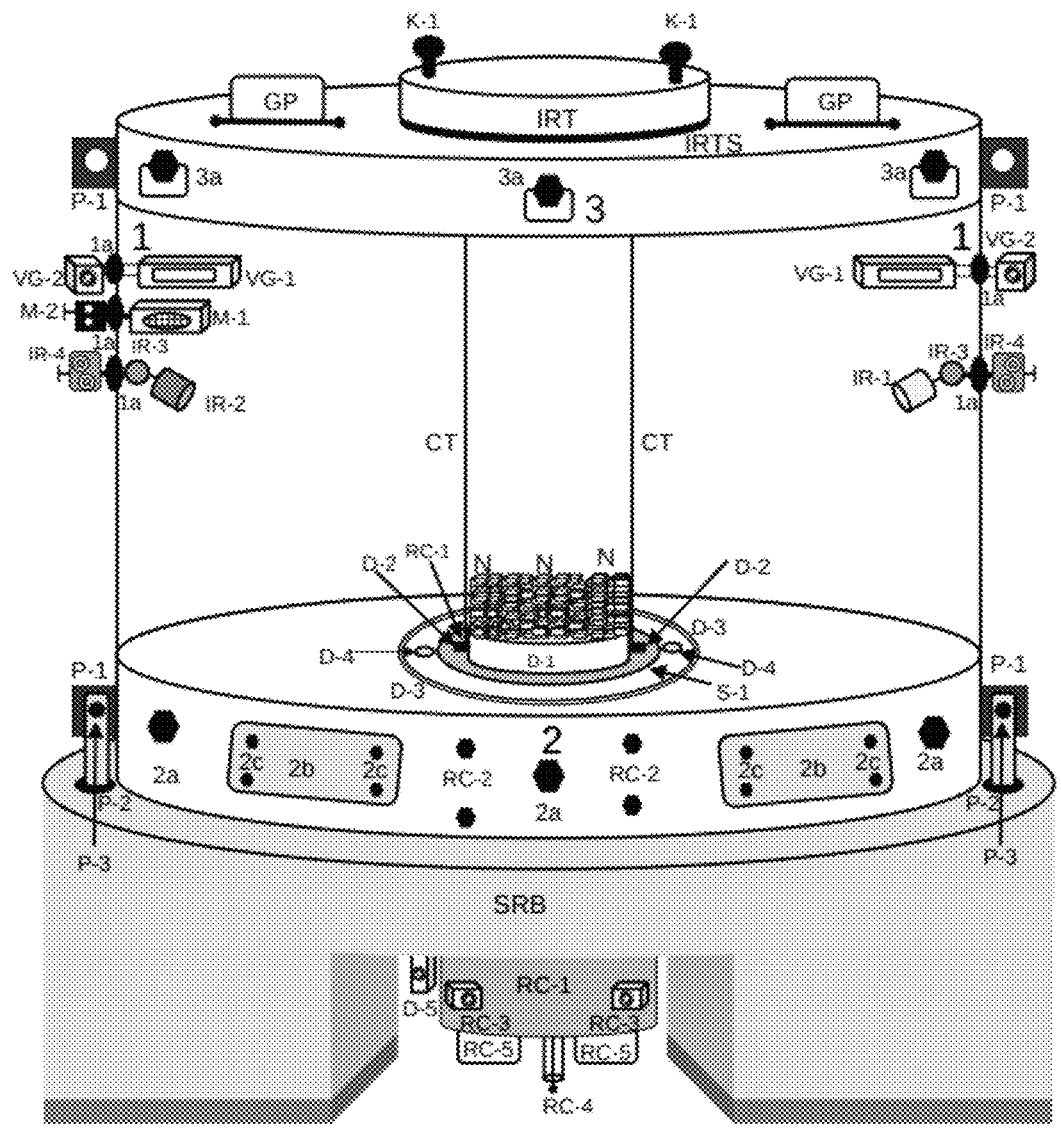
FIG. 11 shows the diamond fabrication reactor configured for isolation, transfer and recovery of end product nanodiamond particles at a post processing apparatus.

For step 3 isolation, transfer, and recovery of the nanodiamond particles, the assembled Guillotine component is removed by loosening and removing threaded keys K-1 and pulling this assembly free of TEC which remains secured to the reactor body (not shown), and cap IRT having a silicone rubber seal on its bottom side is fastened to TEC using threaded keys K-1. This assembly is shown in FIG. 11.

Guillotine top 3 may be fabricated from aluminum or a strong engineering plastic such as Nalgene, polypropylene, or PTFE having threaded inserts for receiving threaded keys K-1 and confinement tube bolts B-1. While borosilicate glass is the preferred material comprising confinement tube CT, CT may be fabricated from any of the materials used for the Guillotine top.

Figure 10:
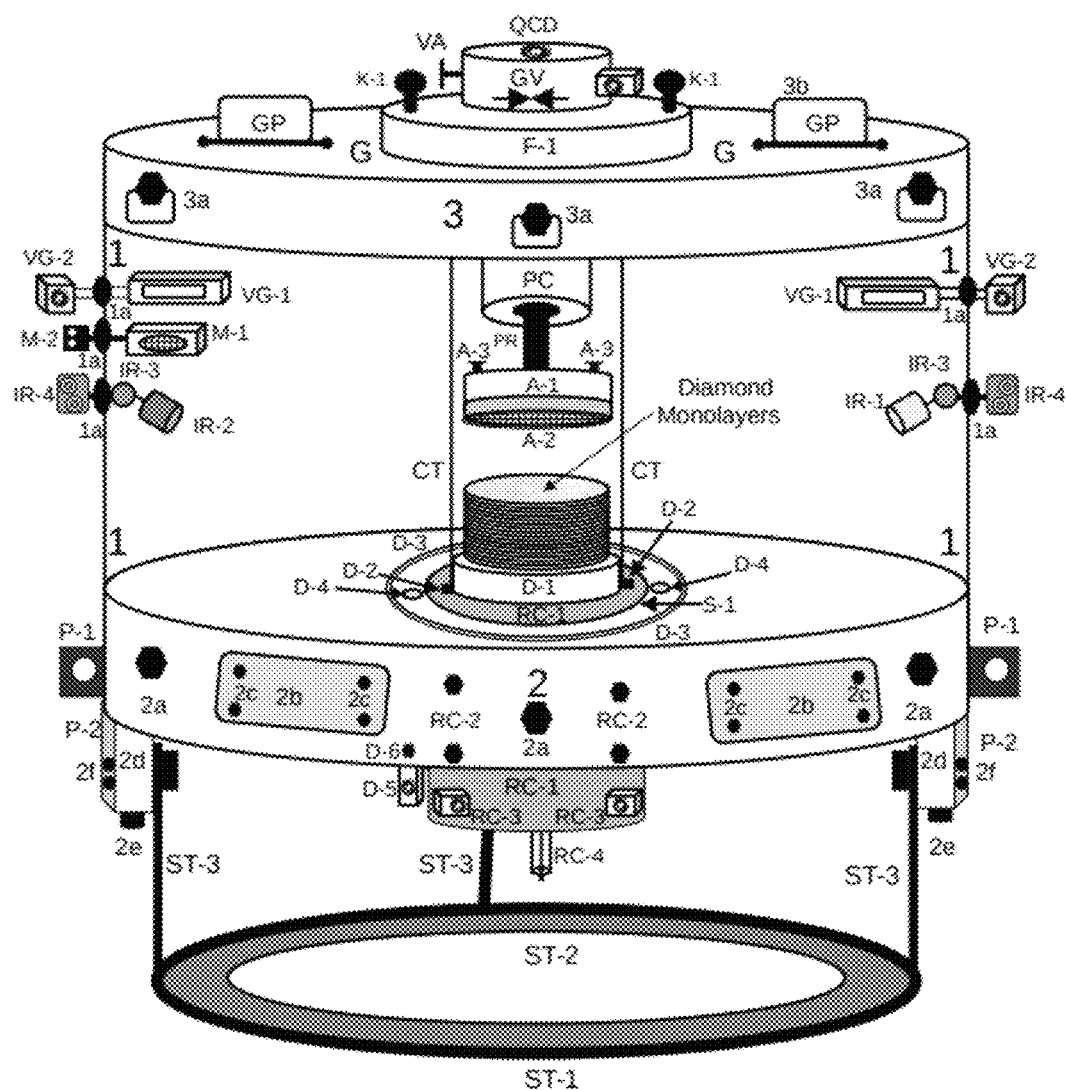
FIG. 10 shows the diamond fabrication reactor configured for formation of diamond nanoparticles using the Guillotine top of FIG. 9.

FIG. 10 shows a non-limiting example of the reactor used for the step 2 procedure for forming nanodiamond particles from the composite stack of diamond monolayers interspersed with excess DHB between each diamond monolayer. In this case, the step 1 reactor has been separated from the magnetic accelerator, and the top end cap is replaced by the Guillotine top detailed in FIG. 9 being secured to reactor body 1 by bolts 3a. This top has no means for connection to the magnetic accelerator flange and cannot accommodate the magnetic accelerator isolation valve and flange. Differing from the reactor of FIG. 8, a tripod stand is attached to the reactor bottom at stand attachment points P-2 extending from the bottom end cap.

Referring to FIG. 10, the reactor top used for step 1 is replaced by Guillotine top G as top end cap 3. Vacuum gas manifolds VG-1, manometric sensor M-1, and infrared emitter-receiver pair IR-1 and IR-2 are retained within cylinder 1 as in step 1. Bottom end cap 2 and its components remain unchanged from step 1, but tripod stand ST-1 comprising stand base ST-2 and struts ST-3 are attached to P-2 by bolts screwed into threads fabricated into struts ST-3 (not shown) through bolt holes (not shown) fabricated into blocks 2d which extend from the bottom of 2 and are secured to 2 by through-bolts 2e screwed into threads fabricated into the bottom of 2 (not shown).

Configured as a Guillotine for fracture of diamond layers into nanodiamond particles, top end cap 3, the Guillotine top, comprises normally closed, manually actuated gate valve GV having flange F-1 secured to 3 by threaded keys K-1 screwed into threads fabricated into the top of 3 (not shown). Single action pneumatic cylinder PC extends from the bottom of GV and is connected to anvil A-1 by threads at the end of piston rod PR of PC and threads within A-1 (connection now shown). Anvil A-1 is pre-assembled to nanomachined strike face A-2 by bolts A-3 screwed into threads in A-2 (not shown). Containment cylinder CT extends from its connection at the bottom of 3 to nubs D-2 extending from RC-1 thus surrounding the Guillotine assembly and the composite stack of diamond monolayers wetted with liquified DHB atop substrate D-1 to confine nanodiamond particles formed by fracture of these diamond monolayers.

In use, strike face is A-2 is inspected for any nanodiamond particles adhering within the recesses of its nanomachined profile from a previous step 2 procedure for removal. The fabrication top is then removed using a flow of inert gas denser than air (Ar or $CO_2$), and top end cap 3 configured for nanodiamond formation as Guillotine top G is placed onto 1 positioning confinement tube carefully around D-1. Top 3 is secured to the reactor body by bolts 3a. A hose extending from an external compressed air source (not shown) is connected to the quick connect-disconnect fluid line fitting QCD of gate valve GV, and the pressure at the output pressure of the compressed air source is brought to a level equal to or greater than that required to fracture the number of diamond monolayers formed on D-1. The refrigerant supply conduits connected to RC-1 at ports RC-3 and the optical fiber connected to RC-1 at RC-4 are disconnected after the refrigerant management system (not shown) has withdrawn refrigerant from RC-1. When the excess DHB has been melted, drained away, and pumped from moat D-3 through drain holes D-4 and fitting D-5 by the DHB management system (not shown) from the step 1 composite, valve actuator VA is pressed to provide the pneumatic force required to propel A-1 to impact the diamond monolayer stack thus fracturing these monolayers into nanodiamond particles having a Z-axis dimension (thickness) which is that of a diamond monolayer and a shape in the X-Y plane which is that of the nanomachined profile for strike face A-2 of anvil A-1. The recognized value of force required to fracture nanodiamond is about 90 Mpa corresponding to ~42 psi for 100 diamond monolayers 2 cm in diameter. The reactor top is then reconfigured for isolation, transfer and recovery of the nanodiamond particles so formed.

Step 3: Reactor Configured for Isolation, Transfer and Recovery

FIG. 11 shows a non-limiting example of the reactor configured for the step 3 procedure of isolation, transfer, and recovery of nanodiamond particles N formed on substrate D-1 and confined by confinement tube CT. The Guillotine assembly shown in FIG. 10 comprising the gate valve, pneumatic cylinder and piston rod, and nanomachined strike face connected to its anvil, has been removed from top 3 by loosening and removing threaded keys K-1 for removal of this assembly for its removal under a flow of inert gas denser than air (Ar or $CO_2$) and its replacement by isolation transfer and recovery top IRT having a silicone rubber gasket IRTS deployed between IRT and 3 providing a fluid and vacuum tight seal preventing environmental incursion into the reactor once threaded keys K-1 are inserted into holes in IRT matching threads fabricated into 3 (not shown) and screwed into these threads. Components deployed within cylinder 1 are not removed (VG-1, M-1, IR-1 and IR-2), but fluid and data line connections to these components are disconnected after IRT has been secured to top 3. Thereupon, the tripod stand ST-1 and stand attachment points P-2 shown and detailed in FIG. 10 are separated from bottom end cap 2, and replaced by silicone rubber block SRB for transfer of the reactor containing the nanodiamond particles into an apparatus such as the load lock of a dry box for recovery and post processing operations. This block provides stable support for the reactor and clearance for the components extending from the bottom of the reactor. SRB is connected to bolt points P-1 by tabs P-2 extending from SRB having holes aligning with those of P-1 through which rubber compression plugs are inserted to secure SRB to the reactor for transfer to a post processing apparatus. Where post processing apparatus clearance is sufficient to receive the reactor having tripod stand ST-1 attached, replacement of ST-1 by SRB is not required.

Second Embodiment Reactor

The second embodiment reactor provides means for all three steps of the method of the present invention without operator reconfiguration of the reactor for each task, and this reactor is not separated from the magnetic accelerator except for service. There is no downtime between steps, the end product nanodiamond particles may be recovered without halting any ongoing procedures within this reactor, and no complex manipulations are required as is the case for the first embodiment reactor.

The second embodiment reactor performs each of the three steps which comprise the overall method of the present invention at several separate stations within the reactor by robotic transport of the diamond fabrication substrate from station to station using commercially available robotic pick and place system components which comprise a robot controller, a pick and place robot mounted on a carriage, a track deployed within the bottom end cap which receives the carriage, and a power supply for powering robot carriage transit and robot end effector pick and place actuations. While only one robot is shown for the non-limiting example of this reactor, more than one robot may be used.

The track provides means and power for robot carriage transit, power and command data for robot rotation, end effector elevation, reciprocation, rotation, and grasp and release functions. Exemplary transit means may be a linear induction motor having a reaction plate integral with the carriage or a toothed track using a stepper motor powered gear drive integral with the carriage. Both transit means are similar to those used for precise micro-positioning in robotic semiconductor pick and place manufacturing apparatus. See, for example, Prodrive Technologies, Boston MA; Hannifin-Parker, Irwin PA; Heidenhain Schaumburg IL.

The controller provides carriage transit power and robot actuation functions power and commands through the track using pickups integral with the carriage in contact with track power delivery means. Typically, AC current powers carriage transit, and robot command data is encoded on the sine wave carrier. Robot actuations are typically driven by DC stepper motors using on-board components to extract DC stepper motor power and end effector commands from AC current.

Regardless of the number of robots used or the transit means, the controller provides no power for carriage transit or robot end effector actuation during a diamond monolayer fabrication event so that the magnetic field of the electromotive force required for carriage transit and robot actuation is collapsed and cannot effect the magnetically susceptible kinetically energized carbyne radicals transiting from the magnetic accelerator into the reactor through the mass flow conduit.

The robot can rotate about the Z-axis, move its pick and place end effector vertically along the Z-axis (elevator), and move its end effector reciprocally (X-axis or Y-axis). The preferred end effector is a rotatable prehensile grasp device having a grapple profile matching that of the diamond fabrication deposition substrate.

Typically, manufacturers of robots and robot controllers provide a firmware library used with robot programming languages which may be articles of commerce or freeware such as robotics implementations of Python, for example, used with operating systems such as Linux, Windows, and OSX. Using CADCAM software which can integrate with the robot programming software, a virtual apparatus is created. In this case, the apparatus is the bottom end cap and its components. CADCAM software implementations for creating virtual machines and virtual apparatus can use machine vision video cameras to provide cartesian coordinate representations of the components which comprise the virtual apparatus. Fiducial markers may be attached to those components which comprise the virtual apparatus for location and dimension during creation of the virtual apparatus. Once the virtual apparatus is created, simulation of robot transit to and from each station and actions by the robot at each station are performed by the programmer for transit and pick and place functions. The virtual apparatus instruction set thus created is uploaded into the robotic controller for optimization by the programmer so that locational and motional data is obtained for the most precise and most accurate robot performance. Once, "trained", the robot controller is ready for pick and place events of this nanodiamond fabrication reactor. Machine vision video cameras can provide a supervisory function to ensure that robot actions are correct and precise. Small deviations from exact positioning and/or end effector movement can be corrected in real time as part of the robotic programming language capabilities. For the present invention, fiducial markers affixed to the deposition substrate and each station are removed after creation of the virtual machine, but the fiducial marker affixed to the robot is retained for machine vision use in precise positioning as all other components having fiducial markers used during virtual machine creation are stationary.

Main computer sense and control software, which is in bidirectional communications with the robot controller, commands the robot controller to move the deposition substrate to a particular station. Upon confirmation that the pick and place service is successful, main computer sense and control software initiates the service required for that station. This sequence of events continues through the entire steps and stations for end product nanodiamond particle formation, whereupon, the robot returns the substrate to the first station.

Services required for diamond monolayer formation, fracture of the diamond monolayer into nanodiamond particles, and nanodiamond particles isolation, transfer, and recovery are provided by components deployed in the top end cap local to a specific station. Each component is unitized and can be completely removed from or inserted into the top end cap through sealed holes fabricated into the top end cap. These components are secured into the top end cap using bolts screwed into threads fabricated into the top end cap for this purpose. Each unitized component has an integral bolt flange and a silicone rubber gasket deployed at the bottom of the flange ensuring a fluid and vacuum tight seal between the flange and the top end cap thus preventing environmental incursion into the reactor once bolts are tightened.

Components providing fluid and evacuation services connect to their respective external supply and control systems using quick connect-disconnect fluid line fitting ports. Data and power line connection terminal blocks are spring loaded push connect-disconnect types which are commercially available.

Figure 12:
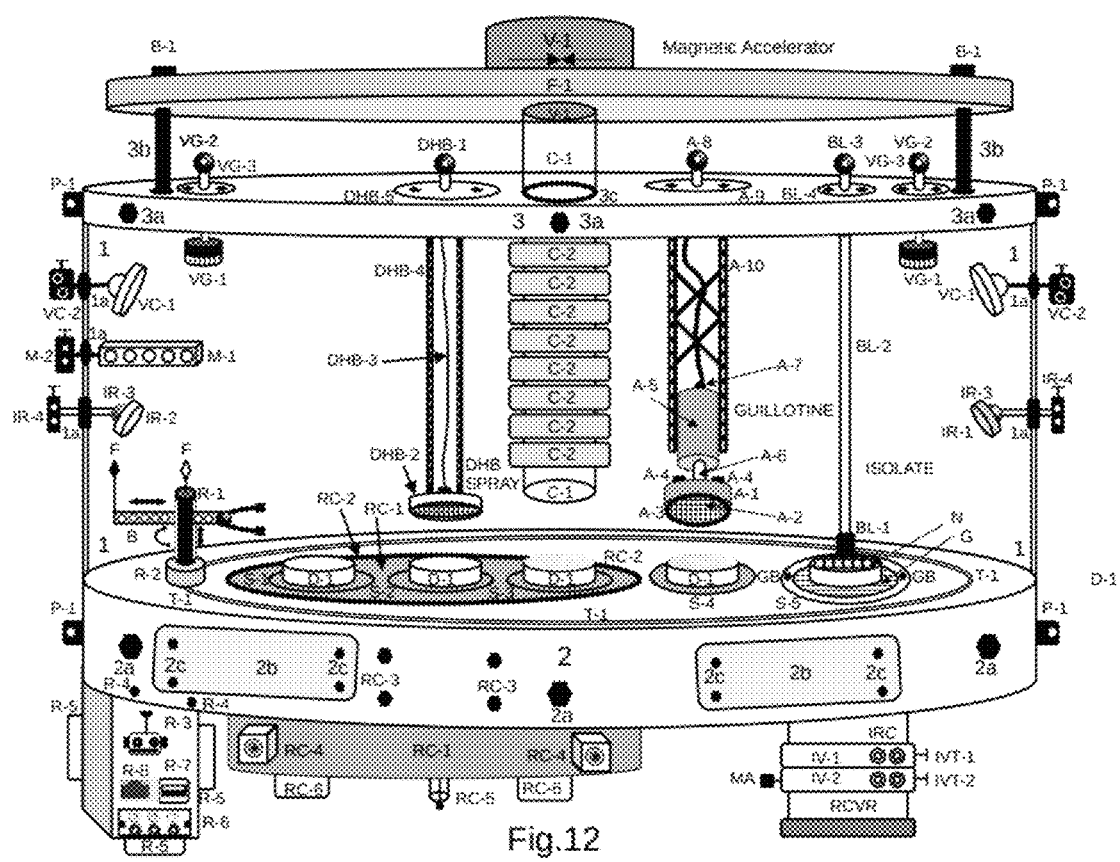
FIG. 12 shows the second embodiment diamond fabrication reactor within which all 3 procedures of the method of the invention are conducted without operator intervention using robot pick and place means.

FIG. 12 shows a non-limiting example of the second embodiment reactor required for the method of the present invention to produce end product nanodiamond particles. Diamond fabrication deposition substrates are shown at all stations for clarity only. In operation, no more than two of these substrates are used, but operation using as many as four substrates is possible. A single robot is shown in this exemplary reactor for clarity.

Referring to FIG. 12, the reactor comprises cylinder 1, bottom end cap 2, and top end cap 3. Top end cap 3 is fastened to 1 by bolts 3*a* inserted into holes aligned with threaded expansion bushings deployed within holes at the top end of cylinder 1 (not shown) which are screwed into these threads to form a vacuum and fluid tight seal between an O-ring deployed around the top end of 1 (not shown) and 3 due to screw force pressure. Attachment points P-1 extending from 3 provide means for bolting the reactor to a support frame (not shown). Posts 3*b* fabricated into 3 are threaded to receive bolts 3*c* from magnetic accelerator connection flange F-1. Magnetic accelerator isolation valve V-1 extends from the magnetic accelerator flange through seal 3*d* deployed in top 3. The magnetic accelerator electromagnet coil core (not shown) extends into V-1 and continues from V-1 within the reactor as mass flow conduit C-1. Permanent magnets C-2 comprised of high coercivity magnetic materials such as Nd or iron nitride ($Fe_{16}N_2$, "Niron") surround C-1 to provide a radical recombination countermeasure for the fluence of kinetically energized carbyne radicals transiting from the magnetic accelerator into the reactor and some degree of radial radical distribution control. Magnetic accelerator isolation valve V-1 is normally closed and is opened upon actuation by main computer sense and control software. The preferred material comprising top end cap 3 is aluminum, but a high strength engineering plastic having threaded bushings fabricated into the end cap may be used.

Dual service manifolds VG-1 provide inert gas into and evacuation of the reactor as uniform flows being connected to an external gas management system (not shown) through ports VG-2 secured to top 3 by bolts in flanges VG-3. Excess DHB is recovered by reduced pressure evaporation through VG-1 into a cold trap for condensation to liquid which is pumped to the DHB reservoir (not shown).

Pressurized DHB liquid is provided by an external DHB management system (not shown) to port DHB-1 connected to spray nozzle DHB-2 by hose DHB-3. Nozzle DHB-1 is supported by bracket DHB-4 extending through an aperture in 3 (not shown) from flange DHB-5 which is secured to 3 by bolts in this flange. DHB liquid is sprayed onto diamond fabrication deposition substrate D-1 cooled to DHB solidus temperature at station S-2 by nozzle DHB-2.

The Guillotine which fractures a diamond monolayer wetted by DHB at station 4 comprises anvil A-1 having nanomachined strike face A-2 connected to A-1 by bolts A-4 screwed into threads within A-2 (not shown) having lip A-3 which confines nanodiamond particles formed by impact of A-2 upon a diamond monolayer on D-1. Anvil A-1 is connected to piston rod A-6 of single action pneumatic cylinder A-5 which receives compressed air from the gas management system (not shown) through flexible hose A-7 extending from port A-8 secured to top 3 by bolts in flange A-9. The assembly of A-1, A-5, and A-6 is supported by bracket A-10 extending through an aperture in top 3 (not shown) from flange A-9.

Nanodiamond particles resident on D-1 supported by grate G at station S-5 are driven from D-1 by expansion of bladder BL-1 in contact with the nanodiamond particles N on D-1. Bladder BL-1 is inflated by compressed air provided by the gas management system (not shown) to BL-1 at port BL-3 through conduit BL-2 extending through an aperture fabricated into top 3 (not shown) from flange BL-4 which is secured to 3 by bolts in this flange. The gas management system restores BL-1 to its deflated state by evacuation after nanodiamond particles N are driven from D-1. Nanodiamond particles driven from D-1 fall through grate G into isolation conduit IRC which extends from a seal at the bottom of 2 (not shown) to means for isolation, transfer, and recovery of end product nanodiamond particles at a post processing apparatus.

Machine vision video cameras VC-1 connected to terminal blocks VC-2 through sealing grommet 1*a* receive power from and provide robot status and location data to the robot control system through VC-2. Fiducial markers F are retained on robot R-1 after virtual machine development for use by VC-1 to provide a supervisory positioning function.

Infrared emitter IR-1 and receiver IR-2 deployed in seals 1a have pivot IR-3 for precise aim and have terminals IR-4 for power and data line connection to an external Reflectance FTIR (Fourier Transform Infrared) spectrometer (not shown) for real time monitoring of diamond monolayer formation.

Manometric sensor M-1 deployed in seal 1a provides vacuum and pressure conditions within the reactor to an external gas management system (not shown) through data line connection terminal block M-2.

Bolts 2a inserted into holes aligned with threaded expansion bushings deployed within holes at bottom end of cylinder 1 (not shown) are screwed into these threads to form a vacuum and fluid tight seal between an O-ring deployed around the bottom end of 1 (not shown) and bottom end cap 2 due to screw force pressure. Attachment points P-1 extending from 2 provide means for bolting the reactor to a support frame (not shown). Access to internal components of 2 is provided by openings fabricated into 2 covered by access plates 2b secured to 2 by bolts 2c screwed into threads fabricated into 2. Bottom end cap 2 may be manufactured from the same materials used for the top end cap because the load upon this end cap due to force of diamond monolayer fracture into nanodiamond particles does not require high fracture toughness. The diamond fabrication deposition substrate used in this reactor should comprise the same high fracture toughness material used for the first embodiment reactor diamond fabrication deposition substrate: a ceramic comprised of cobalt metal mixed with tungsten carbide.

Refrigerant chamber RC-1 deployed within an aperture fabricated into 2 having an O-ring seal RC-2 extend through the bottom of 2. Threads in the sides of RC-1 aligned with holes in 2 receive bolts RC-3 which are screwed into these threads to secure RC-1 within 2. Refrigerant circulating through RC-1 is provided by an external refrigerant management system (not shown) through ports RC-4. An optical semiconductor temperature sensor at the tip of an optical fiber deployed within RC-1 (not shown) connects to the external refrigerant management system (not shown) using fiber optic coupler RC-5 deployed in RC-1. RC-1 is easily inserted into or removed from 2 using bolts RC-3 and grasp points RC-6 fabricated into the bottom of RC-1.

Track T-1 fabricated into bottom end cap 2 provides means for transit of robot R-1 on carriage R-2 which obtains power and command data for R-1 through track T-1 from robot controller R-3. Robot controller R-3 is secured within 2 by bolts R-4 extending through holes fabricated into 2 and screwed into threads within R-3 (not shown). Controller R-3 may be removed from and/or inserted into 2 using grasp points R-5 and bolts R-4. Power is delivered to R-3 at multipin connector R-6. Access to robotic control firmware is provided by USB port R-7, and bidirectional communication between robot controller R-3 and main computer sense and control software is provided by ethernet port R-8.

Stations S-1 through S-3 are locations on the surface of refrigerant chamber RC-1. Station S-4 is not in contract with RC-1 such that excess, unreacted DHB may liquify at this station. Station S-5 is a grate G having an integral bolt flange which attaches to isolation, transfer and recovery conduit IRC extending from grate G through 2 to a receiver for nanodiamond particles driven from D-1. Grate G flange bolts GB screw into threads of isolation and recovery conduit IRC which extends from the flange of G through a seal at the bottom of 2 (not shown) to a pair of normally closed isolation gate valves IV-1 and IV-2 which receive actuation power from an external valve controller (not shown) through terminals IVT-1 and IVT-2 integral with IV-1 and IV-2, respectively. Isolation valve IV-2 is integral with nanodiamond transfer receiver RCVR and has a manual gate actuator MA for use by a technician for transferring and recovering end product nanodiamond particles. Input side male threads of IV-1 screw into female threads of IV-2. Valves IV-1 and IV-2 are opened by an external valve controller prior to expansion of BL-1 so that nanodiamond particles driven from D-1 fall through grate G and through the retracted gates of IV-1 and IV-2 into RCVR. The gates of IV-1 and IV-2 are then shut by the valve controller. At this point, nanodiamond particles within RCVR and the reactor itself are isolated from the environment. IV-2 may be separated from IV-1 for transfer of the nanodiamond particles within RCVR to a post processing facility such as a dry box.

In operation D-1 originates at station S-1 where it is cooled to DHB solidus temperature and is transported by Robot R-1 to station S-2 where DHB is spray deposited onto D-1 cooled to DHB solidus temperature. After a predetermined time needed to solidfy DHB deposited upon D-1 at station S-2, D-1 is transported to station S-3 where kinetically energized carbyne radicals transiting through conduit C-1 react with solidus temperature DHB on D-1 to form a diamond monolayer. D-1 is then transported to station S-4 where DHB liquifies and nanomachined anvil A-2 propelled by the force provided by pneumatic cylinder A-5 drives A-1 onto the diamond monolayer wetted with excess DHB on D-1 fracturing this monolayer into nanodiamond particles having an X-Y plane shape which is that of the profile of nanomachined anvil A-1 strike face A-2 and a Z-axis dimension which is that of the diamond monolayer. D-1 is then transported to station S-5 where nanodiamond particles N formed on D-1 supported by grate G are driven from D-1 by expansion of Bladder BL-1. Nanodiamond particles N driven from D-1 fall through this grate into receiver RCVR for isolation, transfer, and recovery of end product nanodiamond particles N at a post processing apparatus (not shown). Bladder BL-1 is the contracted by evacuation provided by the gas management system, and D-1 is returned to station S-1 for a new nanodiamond particle fabrication sequence.

FIGS. 13A-13D depict the operation of bladder BL-1 and recovery of nanodiamond particles using IRC, IV-1, IV-2, IVT-1, IVT-2, IRC, MA, and RCVR in more detail. Recovery conduit IRC extends from grate G through bottom end cap 2 (not shown) to normally closed isolation gate valve IV-1 connected by threads to normally closed isolation, transfer and recovery gate valve IV-2. Gate valve IV-2 terminates at recovery and transfer receiver RCVR having bottom end cap ITRC connected to it by a threaded connection.

Referring to FIG. 13A bladder BL-1 at the tip of compressed air delivery conduit BL-2 is positioned just above nanodiamond particles N resident upon fabrication substrate D-1 supported by open grate G. Grate G is the terminus of recovery conduit IRC extending from valve IV-1, and IV-2 at the end of recovery and transfer receiver RCVR threaded onto IV-1. The gates of both IV-1 and IV-2 are shut, and bladder BL-1 is deflated.

Referring to FIG. 13B, IV-1 and IV-2 are opened by an external valve controller (not shown). Bladder BL-2 is expanded by compressed air delivered through compressed air delivery conduit BL-2. Expansion of BL-1 causes this bladder to contact nanodiamond particles N on D-1 and drive them from D-1 causing them to fall through open grate G, through recovery conduit IRC and through open gates of IV-1 and IV-2 into receiver RCVR.

Referring to FIG. 13C, IV-1 and IV-2 are commanded shut by an external valve controller (not shown) after nanodiamond particles N have fallen completely through the open gates of IV-1 and IV-2 into RCVR. Bladder BL-1 is evacuated by the gas management system (not shown) to contract it.

Referring to FIG. 13D, the isolation recovery, and transfer of end product nanodiamond particles is shown. Valves IV-1 and IV-2 are shut. Male threads MT-2 extending from IV-2 are shown unscrewed from female threads FT-1 of IV-1. With both valves closed, the reactor and end product nanodiamond particles N are isolated from the environment.

The small profile of RCVR which contains the end product nanodiamond particles simplifies transfer to an end use processing apparatus such as a dry box. IV-1 prevents environmental contaminants from entering the reactor. Trace amounts of DHB adhering to the nanoparticles due to London forces maintain passivation of bond sites of these nanoparticles. At the processing site, the technician opens gate valve IV-2 by pressing manual actuator MA for access to nanodiamond particles contained within RCVR by pouring through them through the open gate of IV-2 or by unscrewing bottom endcap ITRC to release them from RCVR.

Main computer sense and control is alerted by the technician that transfer of the isolated and recovered end product nanoparticles is underway by a pointing device "click" on an icon or a keystroke which causes interruption of an ongoing process at a given station. Once removal of RCVR from IV-1 is complete, another "click" or keystroke re-sets reactor operation to return from the suspended procedure after evacuation of RCVR through valves IV-1 and IV-2. Alternatively, formation of a pre-programmed number of diamond monolayers causes main computer sense and control software to alert a technician that a cycle of nanodiamond particle formation has been completed for removal of the receiver and transfer of end product nanodiamond particles to a post processing apparatus. When the technician restores RCVR to the reactor, a keystroke or click on an icon alerts main computer sense and control software to complete an on-going process, evacuate RCVR and the reactor, and then resume normal operation.

Preferred operation of this second embodiment nanodiamond fabrication reactor is the formation of nanodiamond particles from a single diamond monolayer wetted with excess DHB rather than from the stack of many diamond monolayers interspersed with with excess DHB between each layer. As long as adequate supplies of DHB, acetylene, argon carrier gas, and refrigerants are available to the apparatus of the present invention using the second embodiment nanodiamond fabrication reactor, the entire apparatus can produce nanodiamond particles continuously with unattended operation requiring no operator intervention except for fault alerts generated by main computer sense and control software in response to faults which software control cannot mitigate.

Support Systems

The method and apparatus of this invention requires service from several support systems. Common to both reactor embodiments are: valve actuation control; gas and vacuum management; refrigerant management for the interface component, magnetic accelerator cryostat, and radiolysis output heat exchanger; microwave power supply; magnetic accelerator electromagnet power supply; DHB supply and recycling; spectroscopic monitoring of diamond fabrication and reactor effluent; radiolysis cavity forced air cooling; main computer running dedicated sense and control software; main computer-component and inter-component communication means. All of these systems and/or their components are available as articles of commerce.

Valve Control System

Five gate valves are used by the apparatus exclusive of those valves which comprise support systems services: radiolysis cavity input, output, and isolation valves and the dump valve and magnetic accelerator output isolation valve. Gate valves having high temperature stable and chemically inert gates and 10-20 ms actuation times are commercially available being commonly used in physically and chemically demanding chemical manufacturing environments. Solenoid actuated gate valves having NO on-board logic components are preferred due to the elevated temperature environment of the hydrocarbon radical generator radiolysis cavity. Such valves have "normal" states (open or closed) controlled by the solenoids are spring loaded.

Programmable logic controllers (PLC's) used for valve control service can be acquired from the same manufacturer providing these gate valves. Such controllers comprise fast solid-state switches, one for each valve, a valve actuation power power supply, an embedded CPU and industry standard firmware, and bidirectional communications means.

Refrigerant Management System

Diaphragm compressors used for cryogenic fluids such as hydrogen and noble gases in closed system compression-expansion refrigerant circulation systems are commercially available and can use $CF_4$ which is chemically inert. These apparatus can be provided as individual components or turn key ("intelligent") systems. See, for example, Fuitron Systems of Ivyland PA.

Some $CF_4$ circulation take off is required for commercially available methanol chiller circulation systems to maintain methanol at ~180° K. for the radiolysis cavity output heat exchanger and for the diamond fabrication deposition substrate refrigerant chamber. High capacity recirculating methanol chillers having split outlet and return configurations can cool methanol to ~-25° C. (~248° K.). In-line $CF_4$ heat exchangers deployed in each flow path can reduce customary circulating methanol chiller temperatures to ~180 K. Flow and temperature monitors for this purpose are commercially available. See, for example, J-Kem Scientific of St. Louis MO. Flow sensing monitors using both turbine and differential flow sense integrated with temperature probes can be used for magnetic accelerator electromagnet and heat shield refrigerant chambers are commercially available. See, for example, UFM (Universal Flow Meters) of Hazel Park MI. Secondary argon carrier gas for interface component input is cooled by $CF_4$ heat exchange Gas Management System The gas management system provides acetylene, argon, carbon dixoide, and compressed air services and provides evacuation services for all components of the apparatus. Typically, acetylene is provided in pressurized cylinders over acetone or dimethyl formamide (DMF) due to its explosive instability under pressure. The method the present invention cannot tolerate the presence of ANY of these materials. In line separation apparatus are available from commercial suppliers of these gases to produce acetylene which is free of trace contaminants such as phosphines, arsines, and acetone or DMF. Alternatively, research purity acetylene is commercially available as a blend of acetylene in an inert gas such as argon but in small volume cylinders. The same suppliers of specialty gases such as high purity acetylene-inert gas blends, can provide turn-key gas management systems comprising tanks, valves, compressors, conduits, regulators, manifolds, flow and temperature controllers and sensors, vacuum pumps, in-line purification cartridges, membrane type gas separators, etc. having the software interoperability required by the method and apparatus of this invention. The individual components comprising these turn key systems are also commercially available. Such turn key systems and individual components are used in CVD semiconductor fabrication and CVD diamond fabrication systems.

Microwave Power Source and Delivery System

The power amplifier preferred for the apparatus of this invention does not provide microwave radiolysis power to the microwave radiolysis reactor continuously. Rather, the microwave power amplifier has a duty cycle. Microwave power is provided on demand. Continuous power operation would produce excessive heat for the radiolysis reactor. Within this duty cycle, the microwave power may be provided as a continuous wave or as a series of pulses of width and delay optimized by the user.

This duty cycle places requirements on the type of microwave power amplifier used by the method and apparatus of this invention. The amplifier must have a rapid rise time (time from zero to 100% power). In pulsed mode operation, the delay between pulses should be as short as possible and be very small compared to the width of the pulse. Commercially available microwave power amplifiers which can be remotely controlled having <50 nanoseconds rise times, pulse widths up to 400 microseconds, and pulse delays of about 80 nanoseconds are commercially available. See, for example, IFI (Instruments for Industry; Ametek; Edison NJ) PT-42 capable of up to 8 Kw at 4 Ghz. Such amplifiers are readily interfaced with programmable logic controllers and computers having RS-422, USB, and ethernet communications. This and other commercial suppliers of magnetron power amplifiers can also provide high power wave guides through which microwave power is delivered to the radiolysis cavity.

The preferred microwave power source configuration for the apparatus of this invention is a "slave" power amplifier and a separate pre-amplifier controller commanded by main computer sense using control software to operate the amplifier according to a pre-set profile uploaded into the amplifier controller firmware which can be fabrication, emulation for start-up, or emergency shut down.

Electromagnet Power Supply

High Current DC power supplies can be acquired commercially from numerous sources. These power supplies are routinely provided with network communications capability and can be operated remotely or with programmable firmware. Specialized electromagnet power supplies can be obtained from manufacturers of superconducting magnet equipment which have integral high wattage dump resistors and very fast high current solid-state switches for electromagnet protection. These power supplies are designed to handle the difficult loads presented by electromagnets and can "ramp" current for powering up and powering down (discharging) electromagnets for routine start-up and shut-down operation to minimize internally produced mechanical stress common to powerful electromagnets. A single connection between electromagnet power posts and the power supply provides both supply of power and current drain. While designed for use with superconducting electromagnets, these power supplies can be used with copper magnet wire wound electromagnets which are far less demanding than are superconducting electromagnets. See, for example, Lakeshore Cryotronics of Westerville OH.

DHB Supply and Recycling

DHB (dihydrobenzvalene) is thermally stable at ambient temperatures and below and is inert to atmospheric oxygen and water. Its physical properties (vapor pressure, boiling point, etc. are similar to those of benzene. As such, it does not require unusual conditions or apparatus for its delivery to the diamond fabrication spray bar. It can be delivered using apparatus such as PTFE diaphragm pumps under PLC valve control for delivery of pre-cooled DHB liquid to the reactor spray bars. The delivery system should include means to evacuate the conduit which delivers the DHB to the spray bars also under PLC valve control. The reservoir within which the DHB supply is stored may comprise common medium walled borosilicate glass having input and output ports. The fabrication reactor is configured for recovery and recycling of unreacted DHB, and this service must also be managed by PLC valve control of the DHB delivery and recycling circuit. Where the second embodiment reactor is used, the DHB supply system works in concert with the gas management system which evacuates the reactor. DHB is recovered using a cold trap to condense DHB vapor to liquid. This trap is has means for pumping the condensed DHB to the its reservoir. DHB condenses at a higher temperature than any other substance used by the method and apparatus of the present invention.

Forced Air Cooling

Considerable heat is generated by radiolysis reactor components wave guide and radiolysis cavity. The radiolysis cavity input and output gate valves are the most sensitive of these components whose temperatures and should be kept below 250° C. using forced air cooling. The wave guide generates considerable heat but is less sensitive to heat than are the gate valves. Preferred waveguides for the apparatus of the present invention have forced air cooling fans integral with the waveguide itself and are available commercially. Providers of microwave waveguides can also provide separate cooling fans having pulse width modulation fan motor speed controllers integrated with contact and non-contact infrared temperature sensors. See, for example Microwave Engineering (m.e.c) of Andover MA. Infrared temperature sensors having network communications capability are commercially available. See, for example, New England Temperature Solutions (NETS) of Attleboro MA.

Fabrication Surface and Effluent Monitoring

The most practical spectroscopic monitoring of the diamond fabrication substrate is provided by Reflectance Fourier Transform Infrared Spectrometry (R-FTIR) for which small footprint industrial instruments are commercially available. Small emitters and receivers remote from the instrument itself are common to such commercial products. See, for example, Gateway Analytical Gibsonia, PA Digital libraries of spectra for a vast collection of chemical species are frequently provided with these commercial products or as options, and many are freely available in public domain (academia, NASA, NIST, EPA, etc.). Spectra of diamond, graphite, and non-stoichiometric impurities associated with diamond fabrication are common to such libraries.

Small footprint gas chromatograph-mass spectrometer instruments (GC-MS) are commercially available for reactor effluent monitoring. Digital libraries of the small molecule chemical species used for and produced by the method and apparatus of the present invention are routine features of such commercial products, and such libraries are available in public domain. Effluent monitoring provides useful data for optimizing and monitoring remediation. It may be used with or in place of spectroscopic monitoring where an established and optimized fabrication method is used. Effluent monitoring is useful in emulation and routine shut down and can pinpoint causes for "scram" events. Some GC-MS instruments are small enough and light enough for transport in a suitcase. See, for example, Perkin-Elmer Corporation of Boston MA.

Robotic Controller

Pick and place robots and their control systems are commercially available having high motional precision and resolution and capable of complex manipulations using proprietary software provided with articles of commerce as well as publicly available libraries which can be used with well established computing environments (Windows, Linux Python, IOS, etc.). Robot control is a well established feature of many CAD-CAM simulation and emulation programming tools as articles of commerce and publicly available software.

Communications Hub

Wifi capable ethernet switches and hubs are commercially available. A programmable switch is the most reliable where significant traffic exists on the network of devices used. Every component and system of the apparatus of the present invention must have bidirectional communications capability with the main computer as well as other systems. Ethernet is the most practical, least complex, least expensive, and most secure means for such component networking. Some instruments and apparatus use RS-232, RS-422, and IEEE488 interfaces. Adapters for such interface to ethernet and USB connections are commercially available. Where connection to an external network is required (Internet), security measures such as a firewall and/or "malware" defense software is used Main Computer and Control Software Being the "heart" and "brains" of the apparatus of the present invention, a computer comprising a multi-processor motherboard hosting 4 or more multi-core processors and at lest 64 GB of memory is preferred The motherboard and operating system should be able to support multiple ethernet ports, multiple displays, and multiple USB ports. Where instruments and apparatus use the older communication standards of RS-422, RS-232, and GPIB, slot cards or external adapters for these standards are used.

Sense and control software architecture used for the present invention is common to manufacturing industries of all types. Main computer sense and control software is a supervisory program which commands individual components to perform embedded firmware for a commanded component which component reports task success or task failure. Such responses trigger the supervisory program continue routine procedure, mitigate a fault condition, or shutdown and alert a technician of a fault condition. This strategy reduces the complexity of the supervisory program. Such supervisory software is also referred to as process control software, and libraries of process control software are available as articles of commerce and in the public domain as Unix and Linux implementations. Essentially, supervisory software coordinates a large number of simple software processes running on programmable logic controllers to effect operation of a complex system.

Backup Power

For security sake, backup power supplies for the computer and for control of various ancillary systems are recommended for shutting down the apparatus. The large operational power demands of pumps, amplifiers, compressors used by the apparatus of the present invention would require large battery banks and robust inverters for such backup power which is not recommended, and shut down is preferred over continued operation using such backup power systems.

The invention claimed is:

1. A method for fabricating nanodiamond particles, in a diamond fabrication reactor, which comprises:
    a) forming a composite of a plurality of diamond monolayers interspersed with a plurality of non-monolayers of dihydrobenzvalene (DHB), one over the other, by reacting paramagnetic kinetically energized carbyne radicals with a supported layer of DHB, at DHB solidus temperature, wherein the DHB solidus temperature is maintained during formation of the composite of a plurality of diamond monolayers for each diamond monolayer fabrication,
    b) sealing off any subtended, unreacted DHB from further reaction with the paramagnetic kinetically energized carbyne radicals by the supported layer of DHB at DHB solidus temperature, said paramagnetic kinetically energized carbyne radicals being generated as paramagnetic carbyne radicals from a radiolysis cavity and transiting therefrom through a magnetic accelerator to become kinetically energized and transiting through a mass flow conduit to the supported layer of DHB at DHB solidus temperature, and
    c) bringing the composite of a plurality of diamond monolayers to DHB liquidus temperature and draining subtended, unreacted DHB from the composite and impacting remaining diamond monolayers wetted with DHB with a guillotine having an anvil with a nanomachined strike face and which anvil is driven with sufficient strike force to fracture the remaining diamond monolayers to thereby produce nanodiamond particles having a shape in an X-Y plane matching a profile of the nanomachined strike face and a Z-axis dimension (thickness) which is that of a diamond monolayer.

2. The method of claim 1, wherein the diamond monolayers number 2 to 100.

3. The method of claim 1, wherein step a) comprises a series of steps in the following order:
    i) generating paramagnetic carbyne radicals in an argon carrier gas;
    ii) impacting the paramagnetic kinetically energized carbyne radicals upon a supported non-monolayer of DHB to form a diamond monolayer;
    iii) evacuating a-fabrication reactor to remove volatile side products;
    iv) spray depositing an additional layer of DHB onto the diamond monolayer produced in step ii), and
    v) repeating steps i)-iv) until a target number of diamond monolayers interspersed with additional DHB between each layer is produced.

4. The method of claim 1, wherein said kinetically energized paramagnetic carbyne radicals are formed by a) microwave radiolysis of acetylene diluted within argon carrier gas to first form paramagnetic carbyne radicals, and then transiting said carbyne radicals through a mass flow conduit having means for b) effecting heat dissipation and means for c) providing countermeasures to radical recombination into a magnetic accelerator to form said kinetically energized paramagnetic carbyne radicals.

5. The method of claim 4, wherein said heat dissipation means is a radiolysis cavity output heat exchanger and interface component immediately upstream of said magnetic accelerator, wherein both serve also as radical recombination countermeasures; said radiolysis cavity output heat exchanger and said interface component both being magnetized by permanent magnets.

6. The method of claim 4, wherein said carbyne radicals are kinetically energized with said magnetic accelerator by an electromagnetic force of an electromagnet having said carbyne radicals resident within a core of the electromagnet.

7. The method of claim 1, wherein the strike force is sufficient to fracture a diamond monolayer produced, said strike force being produced by a force of pneumatic pressure.

8. The method of claim 1, wherein the anvil with the nanomachined strike face is fabricated by laser ablation or electron beam etch.

9. The method of claim 1, wherein in step a), paramagnetic carbyne radicals are generated in a radiolysis cavity in the presence of an argon carrier gas.

10. The method of claim 1, wherein said kinetically energized paramagnetic carbyne radicals are generated from acetylene by a microwave power source sufficient to generate said paramagnetic carbyne radicals which are kinetically energized after passing through a magnetic accelerator.

11. The method of claim 3, wherein said step i) of step a) further comprises a burst of argon gas as a radical recombination countermeasure as an argon plasma in addition to the argon carrier gas for the generated kinetically energized paramagnetic carbyne radicals.

12. The method of claim 1, wherein the nanodiamond fabrication reactor provides an effluent conduit for allowing the additional DHB to liquefy and draining said liquid DHB from the plurality of formed diamond monolayers, and thereby leaving a stack of diamond monolayers wetted by residual DHB adhering to the diamond monolayers by London forces.

13. The method of claim 1, which further comprises isolation, transfer and recovery of the nanodiamond particles.

* * * * *